US008474047B2

(12) United States Patent
Adelstein et al.

(10) Patent No.: US 8,474,047 B2
(45) Date of Patent: *Jun. 25, 2013

(54) REMOTE COLLECTION OF COMPUTER FORENSIC EVIDENCE

(75) Inventors: Frank N. Adelstein, Ithaca, NY (US); Matthew A. Stillerman, Ithaca, NY (US); Robert A. Joyce, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,859

(22) Filed: May 7, 2012

(65) Prior Publication Data

US 2012/0221633 A1 Aug. 30, 2012

Related U.S. Application Data

(60) Continuation of application No. 12/370,447, filed on Feb. 12, 2009, now Pat. No. 8,176,557, which is a division of application No. 10/608,767, filed on Jun. 23, 2003, now Pat. No. 7,496,959.

(51) Int. Cl.
*G06F 12/14* (2006.01)

(52) U.S. Cl.
USPC .............. 726/23; 726/24; 726/25; 713/187

(58) Field of Classification Search
None
See application file for complete search history.

(56) References Cited

U.S. PATENT DOCUMENTS

| 6,345,283 | B1 | 2/2002 | Anderson |
|---|---|---|---|
| 6,792,545 | B2 * | 9/2004 | McCreight et al. ............. 726/29 |
| 7,058,968 | B2 | 6/2006 | Rowland et al. |
| 7,496,959 | B2 | 2/2009 | Adelstein et al. |
| 7,536,456 | B2 | 5/2009 | Williams et al. |
| 7,748,040 | B2 | 6/2010 | Adelstein et al. |
| 7,885,190 | B1 | 2/2011 | Roesch et al. |
| 7,895,317 | B2 | 2/2011 | Gingell et al. |
| 8,176,557 | B2 | 5/2012 | Adelstein et al. |
| 2002/0078382 | A1 | 6/2002 | Sheikh et al. |
| 2002/0129264 | A1 | 9/2002 | Rowland et al. |
| 2002/0162017 | A1 | 10/2002 | Sorkin et al. |
| 2002/0163934 | A1 | 11/2002 | Moore et al. |
| 2003/0208689 | A1 | 11/2003 | Garza |
| 2004/0260733 | A1 | 12/2004 | Adelstein et al. |
| 2007/0297349 | A1 | 12/2007 | Arkin |
| 2008/0114873 | A1 | 5/2008 | Chakravarty et al. |
| 2009/0019141 | A1 | 1/2009 | Bush et al. |
| 2009/0089361 | A1 | 4/2009 | Womack et al. |
| 2009/0164522 | A1 | 6/2009 | Fahey |
| 2009/0216867 | A1 | 8/2009 | Pusateri et al. |
| 2010/0077075 | A1 | 3/2010 | Cuni et al. |
| 2011/0167154 | A1 | 7/2011 | Bush et al. |

FOREIGN PATENT DOCUMENTS

WO 02071192 A2 9/2002

* cited by examiner

*Primary Examiner* — Pramila Parthasarathy
(74) *Attorney, Agent, or Firm* — Shumaker & Sieffert, P.A.

(57) ABSTRACT

The invention is directed to techniques for allowing a user to remotely interrogate a target computing device in order to collect and analyze computer evidence that may be stored on the target computing device. A forensic device receives input from a remote user that identifies computer evidence to acquire from the target computing device. The forensic device acquires the computer evidence from the target computing device and presents a user interface for the forensic device through which the remote user views the computer evidence acquired from the target computing device. In this manner, forensic device allows the user to interrogate the target computing device to acquire the computer evidence without seizing or otherwise "shutting down" the target device.

63 Claims, 17 Drawing Sheets

FIG. 13B

REMOTE COLLECTION OF COMPUTER FORENSIC EVIDENCE

This application is a continuation of U.S. application Ser. No. 12/370,447, filed Feb. 12, 2009, which is a divisional of U.S. application Ser. No. 10/608,767, filed Jun. 23, 2003, now U.S. Pat. No. 7,496,959, the entire contents of each of which are incorporated herein by reference.

TECHNICAL FIELD

The invention relates to computer forensics and, more particularly, to techniques for remotely acquiring and analyzing computer forensic evidence relating to a target computer.

BACKGROUND

Computer forensics is the application of computer investigation and analysis techniques to identify and capture potential legal evidence stored or otherwise maintained within a computing device. The evidence might be sought during an investigation for a wide range of potential computer crimes or misuse, including theft of trade secrets, theft of service, theft of or destruction of intellectual property, fraud, hacking, and other criminal or misuse activities. Unlike paper evidence, computer evidence can exist in many forms, with earlier versions and even some deleted versions of the evidence still accessible on a storage medium. Forms of computer evidence may include, for example, system log files, executing processes, stored files and the like.

An investigator may draw on an array of methods to discover and capture evidence from a computer device. One common method for obtaining computer evidence is on-site inspections or seizure of the computer. For example, the investigator may physically connect an analysis device to the target computer or load analysis software on the target device to acquire and analyze the computer evidence. However, when these discovery techniques are used on computers critical to a network, e.g., servers, the investigation may become burdensome on the network users. Moreover, it is often desired to collect evidence from a computer over time without being detected by a perpetrator of the crime, which can be difficult with many of these invasive techniques.

SUMMARY

In general, the invention is directed to a computer forensic system for retrieval and analysis of computer evidence. The computer forensic system includes a forensic device that allows a user, such as an investigator or network administrator, to remotely interrogate a target computing device in order to collect and analyze computer evidence that may be stored on target computing device. The forensic device allows the user to acquire the computer evidence from the target computing device with a reduced impact on target computing device. In other words, the forensic device allows the user to interrogate the target computing device to acquire the computer evidence without requiring the physical seizure or otherwise "shutting down" of the target device.

The forensic device may be physically connected to the same local subnet as the target computing device, e.g., the same LAN on which the target computing device resides. The forensic device may, for example, obtain an Internet Protocol (IP) address within the subnet scope of the LAN to which the target device is connected. The forensic device may obtain the IP address either dynamically via a protocol such as Dynamic Host Configuration Protocol (DHCP) or statically via configuration by a network administrator.

The forensic device provides a seamless, network-based interface by which the remote user accesses the forensic device. Particularly, the user may connect to the forensic device via a web-based interface over either a public or private network. The connection through which the user connects to the forensic device may be a secure connection through the network such that all the data sent between the forensic device and the user is encrypted to prevent unauthorized access to the data. The forensic device may utilize a communication protocol such as HTTPS (hypertext transport protocol with SSL, secure socket layer) to send encrypted data securely to the user.

Once the user is connected and logged into the forensic device, the forensic device presents the user with a list of available forensic inquiries as well as an option to create a new forensic inquiry. The user may create a new forensic inquiry to acquire data, i.e., computer evidence, from the target computing device. The forensic device may, for example, present the user with one or more screens to allow the user to input information necessary for the creation of the new forensic inquiry. The forensic device may require the user to input case information to associate the new forensic inquiry with an ongoing case as well as target device information specifying a target device of the new inquiry. The target device of an inquiry may be the same as, or different than, the target device of any other inquiry in the same case. The case information may include, for example, a case number, case name, principle investigator, location to store the collected data, and a time zone for data and time reporting. Target device information may include a target device host name, IP address, operating system, access methods and password. The forensic device generates a new forensic inquiry based on the data input by the user and stores the inquiry information, e.g., case information and target device information.

The forensic device presents a wide array of possible acquisition operations that the forensic device may perform for the newly defined inquiry. The acquisition operations include, for example, acquiring log files, communication statistics, e.g., Ethernet or protocol statistics, general system data, running process information, open network ports and associated processes, account information, file sharing information, TCP/IP network information, and the like. The user may select any combination of the possible acquisition operations provided by the forensic device to acquire state information of the target computing device as well as files and additional computer evidence.

In return, the forensic device interrogates the target device to acquire the data, i.e., computer evidence, identified by the user. Particularly, the forensic device performs the combination of acquisition operations selected by the user and stores the acquired data. The forensic device communicates commands associated with the acquisition operations to the operating system of target computing device. The forensic device is platform independent, i.e., can communicate with any target device regardless of the type of operating system run on the target device. In other words, the forensic device may acquire data from a target device running on any type of operating system, e.g., Windows® 2000, Windows NT®, Unix®, MacOS™ and the like.

The forensic device performs the selected combination of acquisition operations in a determined order to reduce the impact the acquisition operations have on other data stored within target computing device. In other words, upon receiving the selection of the user, the forensic platform analyzes the selected combination of acquisitions operations and determines an order for their performance to maintain the integrity of the captured evidence. For example, some acquisition operations may have dependencies on other acquisition operations. In other words, the performance of one acquisition operation may affect the integrity of the evidence yet to be captured by another acquisition operation. For example, acquisition operations performed prior to the acquisition operation to acquire a log file may result in additional entries in the log file. In this case, the acquisition operation to acquire log files should be performed early in the acquisition process to reduce the amount of change to the data. The forensic device invokes the acquisition operations on the target computing device in a particular order to reduce the affects of these dependencies.

Upon acquisition of the computer evidence from the target computing device, the forensic device stores an original copy of the acquired data. In addition, the forensic device normalizes the acquired data, i.e., converts the acquired data to a standard format, to enhance the ability of forensic device to analyze the acquired data. For example, normalizing the acquired data allows the forensic device to simultaneously analyze data acquired from target devices with different operating systems, target computing devices running in different time zones, and the like. The forensic device may, for instance, convert timestamp data from a local time zone of the target device to a standard time zone, e.g., UTC. In addition, the forensic unit may convert data that has host names and IP addresses to all one format, i.e., either all host names or all IP addresses.

Further, the forensic device preserves the authenticity of the data. The forensic device may, for example, take a checksum of the acquired data using a cryptographic hash, such as an MD5 hash, and store the associated hash value. The cryptographic hash produces an output "fingerprint" for data on which the hash is performed that is computationally infeasible to duplicate using a different set of data. In this manner, the user can prove the integrity of the data by reapplying the cryptographic hash to the original data to obtain a fingerprint and comparing the fingerprint to the fingerprint taken at the time the data was acquired.

The forensic device provides one or more data analysis software modules ("tools") to the user for viewing and analyzing the data. The data analysis tools may include, for example, a time analysis tool, a checksum verification tool, a file viewer, and network tools. The time analysis tool may be used to analyze log files for tampering. More specifically, the time analysis tool may analyze the log files to verify the log file entries are in chronological order, to detect anomalous gaps in the log entries, and to detect the absence of expected periodic log entries. The checksum verification tool allows the user to run the cryptographic hash on one or more files and compare the results with the fingerprint obtained upon acquisition of the original files. The file viewer presents data acquired from target device to the user. The file viewer may present the user with raw data, summaries of the data, or the like.

After viewing and analyzing at least a portion of the acquired data, the user may determine whether acquisition of additional data is necessary. The forensic device allows the user to acquire additional data from the target computing device. The forensic device may, for example, provide the user with the ability to acquire additional files or additional system state data from the target device. For instance, the user may browse through a file directory of the target computing device and select a particular file to acquire. The user continues to acquire, analyze and interpret data from the target computing device to determine the next step of the investigation, e.g., seize the target computing device, continue to monitor the target computing device, or look for evidence elsewhere.

Additionally, the forensic device provides measures to ensure that the authenticity of the evidence collected may be verified for use in legal proceedings. In particular, the forensic device maintains an audit log of every transaction and operation performed during the evidence acquisition process, and associates the log file with the respective inquiry. For example, the audit log may include a timestamp corresponding to each transaction, an investigator identifier corresponding to the investigator performing each transaction, and a description of each transaction. The audit log may be used to determine the impact that the investigation, i.e., the acquiring of computer evidence from target computing device, may have on other data stored on target computing device, which may aid in analysis of the acquired computer evidence as well as preserving the authenticity of the acquired computer evidence. In addition, the forensic device may be configured to only perform "constrained" searches in which the user may have limited privileges within the target computing device, thereby providing a degree of security as to the use and application of the forensic device.

In one embodiment, the invention provides a method comprising receiving input from a remote user of a client device that identifies computer evidence to acquire from a target computing device, acquiring the computer evidence from the target computing device with a forensic device coupled to the target computing device via a communication link, storing the computer evidence on the forensic device, and presenting a user interface for the forensic device through which the remote user views and analyzes the computer evidence acquired from the target computing device.

In another embodiment, the invention provides a system comprising a target computing device, a forensic device coupled to the target computing device via a communication link, a client device, and a user interface module to present a user interface for the forensic device that is remotely accessible by the client device, wherein the forensic device receives input via the user interface that identifies computer evidence to acquire from a target computing device and, in response, acquires the computer evidence from the target computing device, stores the computer evidence, and presents the computer evidence to the remote user for analysis via the user interface.

In another embodiment, the invention provides an interrogation method to remotely acquire computer forensic evidence comprising receiving input from a remote user that identifies computer evidence to be acquired from a target computing device, determining an order in which to perform acquisition operations to acquire the computer evidence from the target computing device with reduced impact on other data stored on the target computing device, wherein acquisition operations to acquire at least one of an log file and communication statistics occur in the order prior to any other acquisition operations, and communicating commands to initiate the acquisition operations on the target computing device in accordance with the determined order.

In a further embodiment, the invention provides a method comprising interrogating a target computing device to acquire an log file, analyzing the log file to detect log file tampering, and displaying to a user the results of the analysis.

In yet another embodiment, the invention provides an apparatus comprising an abstraction module that acquires data identified by a remote user from a target computing device and stores the computer evidence, and a user interface module the presents the remote user with a user interface for the remote user to view and analyze the computer evidence.

In another embodiment, the invention provides an apparatus comprising a data acquisition module that identifies one or more acquisition operations to perform to acquire computer evidence, an abstraction module that performs the acquisition operations to acquire the computer evidence from a target computing device, wherein the abstraction module includes a plurality of interrogation agents that issue commands associated with the acquisition operations based on the type of operating system executed on the target computing device and the type of computer evidence desired, a data analysis module that includes one or more data analysis tools, and a user interface module to present a user interface for a remote user to interact with the data analysis module to view and analyze the collected computer evidence.

In a further embodiment, the invention provides a forensic analysis device that is adapted to operate as an intermediate device between a target computing device and a client device associated with a remote forensic investigator, wherein the analysis device comprises an acquisition module to acquire state information from the target computing device, and store the state information on the forensic device while the target device remains active.

In yet another embodiment, the invention provides a computer-readable medium comprising instructions to cause a processor to receive input from a remote user of a client device that identifies computer evidence to acquire from a target computing device, acquire the computer evidence from the target computing device with a forensic device coupled to the target computing device via a communication link, store the computer evidence on the forensic device, and present a user interface for the forensic device through which the remote user views and analyzes the computer evidence acquired from the target computing device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 13A and 13B are screen illustrations of an exemplary user interface presented to the remote user upon selecting a process name in the user interface of FIG. 11.

DETAILED DESCRIPTION

Figure 1:
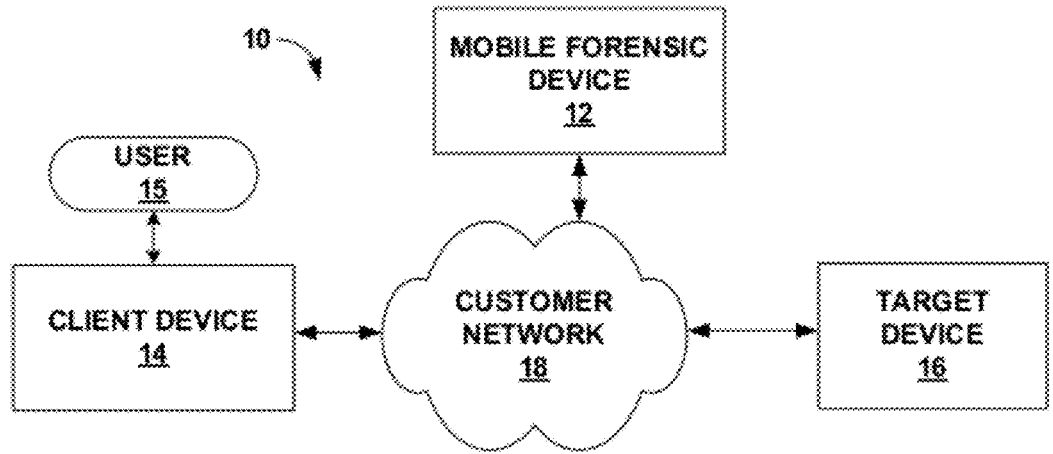
FIG. 1 is a block diagram illustrating an exemplary computer forensic system for retrieval and analysis of computer evidence.

FIG. 1 is a block diagram illustrating a computer forensic system 10 for retrieval and analysis of computer evidence. Computer forensic system 10 includes a forensic device 12 that allows a client device 14 operated by a user 15, such as an investigator or network administrator, to remotely interrogate a target computing device 16 in order to collect and analyze computer evidence that may be stored on target computing device 16. Forensic device 12 allows user 15 to acquire the computer evidence from target computing device 16 with a reduced impact on target computing device 16. For example, target computing device 16 need not be physically seized or otherwise "shut down" in order to acquire the computer evidence.

As illustrated in FIG. 1, client device 14, forensic device 12 and target computing device 16 are coupled to a common network, such as customer network 18. In this manner, customer network 18 acts as a communication link connecting forensic device 12 with target computing device 16. Customer network 18 may, for example, be a local area network for a specific site of an enterprise, or may span geographically distributed sites within the enterprise. In other words, customer network 18 may include one or more Local Area Networks (LANs), Wide Area Network (WANs), Wireless LANs or the like. Additionally, customer network 18 may include digital subscriber lines (DSLs), cables or other broadband connections. Customer network 18 may includes one or more connected network devices (not shown), such as personal computers, laptop computers, handheld computers, workstations, servers, routers, switches, printers, fax machines, or the like.

In general, forensic device 12 is typically connected to the same local subnet as target computing device 16, although this is not required. For example, in an embodiment in which customer network 18 includes more than one LAN, forensic device 12 may be connected to the same LAN as target computing device 16. In this manner, forensic device 12 obtains an Internet Protocol (IP) address within the subnet scope of the LAN to which target computing device 16 is connected. Forensic device 12 may obtain the IP address dynamically, e.g., via Dynamic Host Configuration Protocol (DHCP), or statically via configuration by a network administrator. Client device 14 connects user 15 to forensic device 12 via a secure connection through customer network 18. In this manner, all the data sent between forensic device 12 and user 15 is encrypted to prevent unauthorized access to the data. Forensic device 12 may, for example, use a communication protocol such as HTTPS (hypertext transfer protocol with SSL, secure socket layer) to encrypt and transmit data securely to user 15. Forensic device 12 may comprise a laptop computer, network appliance, or other computing device that includes a web server for communicating with client device 14 and one or more interrogation agents that acquire data from the operating system of target device 16. Target computing device 16 may comprise a personal computer, a handheld computer, a laptop computer, a workstation, a router, a gateway device, a firewall device, a web server, a file server, a database server, a mail server, a print server, a network-enabled personal digital assistant, and a network-enabled phone.

As will be described in further detail below, forensic device 12 allows user 15 to create a forensic inquiry to acquire computer evidence from target computing device 16. Forensic device 12 may present a login screen to user 15 via which user 15 inputs a username and password to connect to forensic device 12. User 15 may then input case information and target device information to define the forensic inquiry. The case information may associate the inquiry with a particular case currently under investigation. Target device information defines characteristics associated with target computing device 16, such as a host name of target device 16, an IP address associated with target device 16, a type of operating system run by target device 16, a password for accessing target device 16, and one or more methods for accessing target device 16, e.g., via invoking a Windows Management Instrumentation (WMI) or Server Message Block (SMB) client. User 15 may obtain at least a portion of the target device information from a network administrator or other individual prior to logging into forensic device 12. Forensic device 12 generates a new forensic inquiry based on the information input by user 15.

Forensic device 12 presents to user 15 a comprehensive list of possible acquisition operations that forensic device 12 can perform for the created forensic inquiry. The term "acquisition operation" refers to commands that forensic device 12 issues to target computing device 16 to acquire computer evidence, referred to herein generally as "data," from target computing device 16. User 15 specifies a combination of the acquisition operations to perform.

In response, forensic device 12 initiates the acquisition operations on target computing device 16 via one or more of the identified access methods to acquire data from target computing device 16. As will be described, forensic device 12 acquires the computer evidence from target computing device 16 while the target computing device is active. In other words, forensic device 12 acquires the computer evidence from the target computing device 16 without target computing device 16 being physically seized or otherwise "shut down." Additionally, forensic device 12 acquires the computer evidence from the target computing device without having to pre-load acquisition software on target computing device 16 prior to acquiring the computer evidence, i.e., prior to forensic device 12 beginning the investigation.

In accordance with one aspect of the invention, forensic device 12 may perform the acquisition operations in a particular order to reduce the impact the operations have on other data stored within target computing device 16, thereby maintaining the integrity of the data. In other words, some of the acquisition operations can change other data stored within target device 16. For example, acquisition operations performed before the acquisition operation for acquiring Ethernet statistics may change the Ethernet statistics, e.g., increase the unicast packet count. In this case, the acquisition operation to acquire the Ethernet statistics as well as any other acquisition operation whose associated data may be changed by performance of other acquisition operations should be performed early in the initial acquisition process. Forensic device 12 may use different access methods for acquisition operations based on the type of data to be acquired from target computing device 16 as well as the type of target computing device, e.g., the type of operating system executed by the target computing device. For example, forensic device 12 may perform an acquisition operation to acquire a log file via WMI while performing an acquisition operation to acquire network protocol statistics via SMB. In another example, forensic device 12 may perform an acquisition operation to acquire computer evidence from a target device with a Windows operating system via WMI while performing an acquisition operation to acquire computer evidence from a UNIX operating system using File Transfer Protocol (FTP).

Forensic device 12 may perform one or more actions on data acquired from target computing device 16 to normalize the data and further preserve the integrity of the data. Initially, forensic device 12 stores a copy of the original data acquired from target computing device 16. Forensic device 12 may further perform a cryptographic hash on all data at the time of acquisition, and store the resulting hash value for future comparison to verify the accuracy and integrity of the data at the time of use, e.g., within a legal proceeding. In addition, forensic device 12 may create a copy of the data in which the data is normalized to a common format to aid in the analysis. Further, forensic device 12 may instruct target computing device 16 to compute a cryptographic hash on the data before copying the data to forensic device 12 in order to ensure the data's integrity in transit.

Forensic device 12 provides user 15 with data analysis tools for viewing and analyzing the data acquired from target computing device 16. The data analysis tools may include, for example, a time analysis tool, a checksum verification tool, a file viewer, and network tools. Forensic device 12 may acquire computer evidence from target computing device 16 and allow user 15 to view and analyze the computer evidence via the data analysis tools with the data on-line. In this manner, user 15 does not have to go "off-line" to analyze the acquired data. In some cases, forensic device 12 may even allow user 15 to view and analyze previously acquired computer evidence while forensic device 12 collects additional forensic evidence. In this manner, the collection and analysis of forensic evidence may be done in parallel. As will be described, the time analysis tool may be used to analyze log files for tampering. Log files include system event log, application event log, security event log, web server log files, Unix SYSLOG files, mail log files, accounting log files, and router flow log files, and other files that maintain a list of operations performed by target computing device 16. More specifically, the time analysis tool may analyze the log files to verify the log file entries are in chronological order, to detect anomalous gaps in the log entries, and to detect the absence of expected periodic log entries.

After viewing and analyzing a portion of the data, user 15 may determine whether acquisition of more data is necessary. Forensic device 12 further provides user 15 with the ability to acquire supplementary data in addition to the data acquired in the initial acquisition. Forensic device 12 provides user 15 with the capability to acquire additional files or additional system state data from target computing device 16.

From the analysis of the data acquired from target computing device 16, user 15 may determine additional steps that need to be taken after the retrieval and analysis of the computer evidence from target computing device 12. User 15 may, for instance, determine that target computing device 16 should be seized, continue to be monitored, or does not hold the necessary data and therefore look elsewhere. Although the example of FIG. 1 illustrates forensic device 12 monitoring a single target computing device 16 for exemplary purposes, forensic device 12 may monitor a plurality of target computing devices. In addition, user 15 may connect to multiple forensic devices to interrogate target computing devices on different LANs. For example, user 15 may access a first forensic device coupled to a first LAN to acquire data from a first target device and access a second forensic device coupled to a second LAN to acquire data from a second target device. In this manner, user 15 may acquire and analyze computer evidence from multiple target devices located on multiple LANs.

Figure 2:
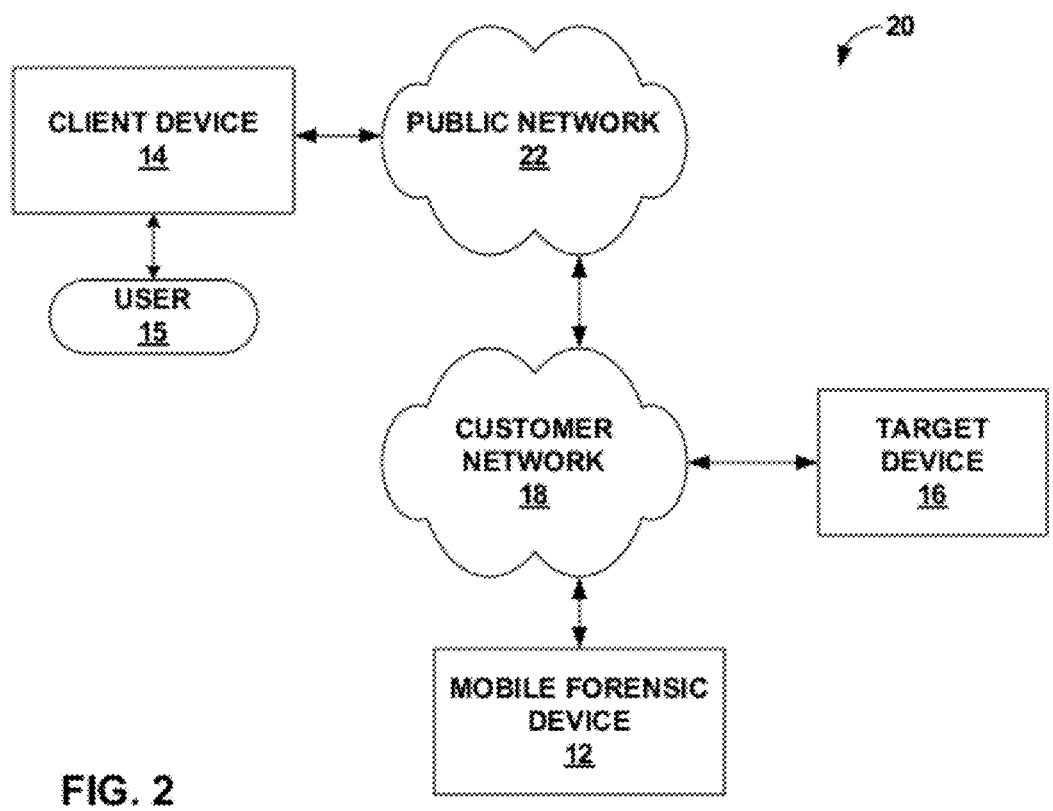
FIG. 2 is a block diagram illustrating another exemplary computer forensic system for retrieval and analysis of computer evidence.

FIG. 2 is a block diagram illustrating another exemplary computer forensic system 20 for retrieval and analysis of computer evidence in accordance with this disclosure. In this illustrated embodiment, computer forensic system 20 conforms substantially to computer forensic system 10 of FIG. 1, but user 15 connects to forensic device 12 via a public network 22, such as the Internet. Public network 22 may include digital subscriber lines (DSLs), cables or other broadband connections. In the example of FIG. 2, client device 14 may be configured to access forensic device 12 through a local network firewall or other network infrastructure of customer network 18.

Figure 3:
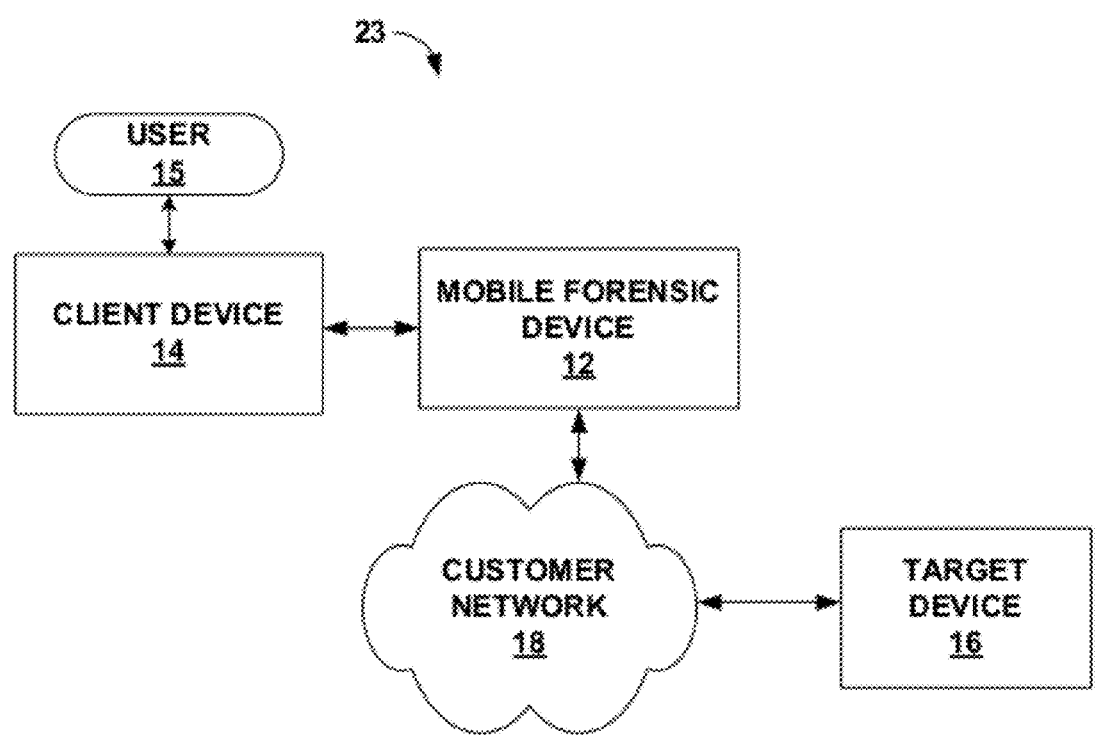
FIG. 3 is a block diagram illustrating another exemplary computer forensic system for retrieval and analysis of computer evidence.

FIG. 3 is a block diagram illustrating another exemplary computer forensic system 23 for retrieval and analysis of computer evidence in accordance with this disclosure. In this illustrated embodiment, computer forensic system 23 conforms substantially to computer forensic system 10 of FIG. 1, but user 15 connects directly to forensic device 12 instead of connecting to forensic device 12 via a network. In the example of FIG. 3, client device 14 may be configured to access forensic device 12 via a direct communication link, such as a phone line, a universal serial bus (USB), a wireless port, a serial port, a parallel port, an infrared (IR) link or any other type of direct connection.

Figure 4:
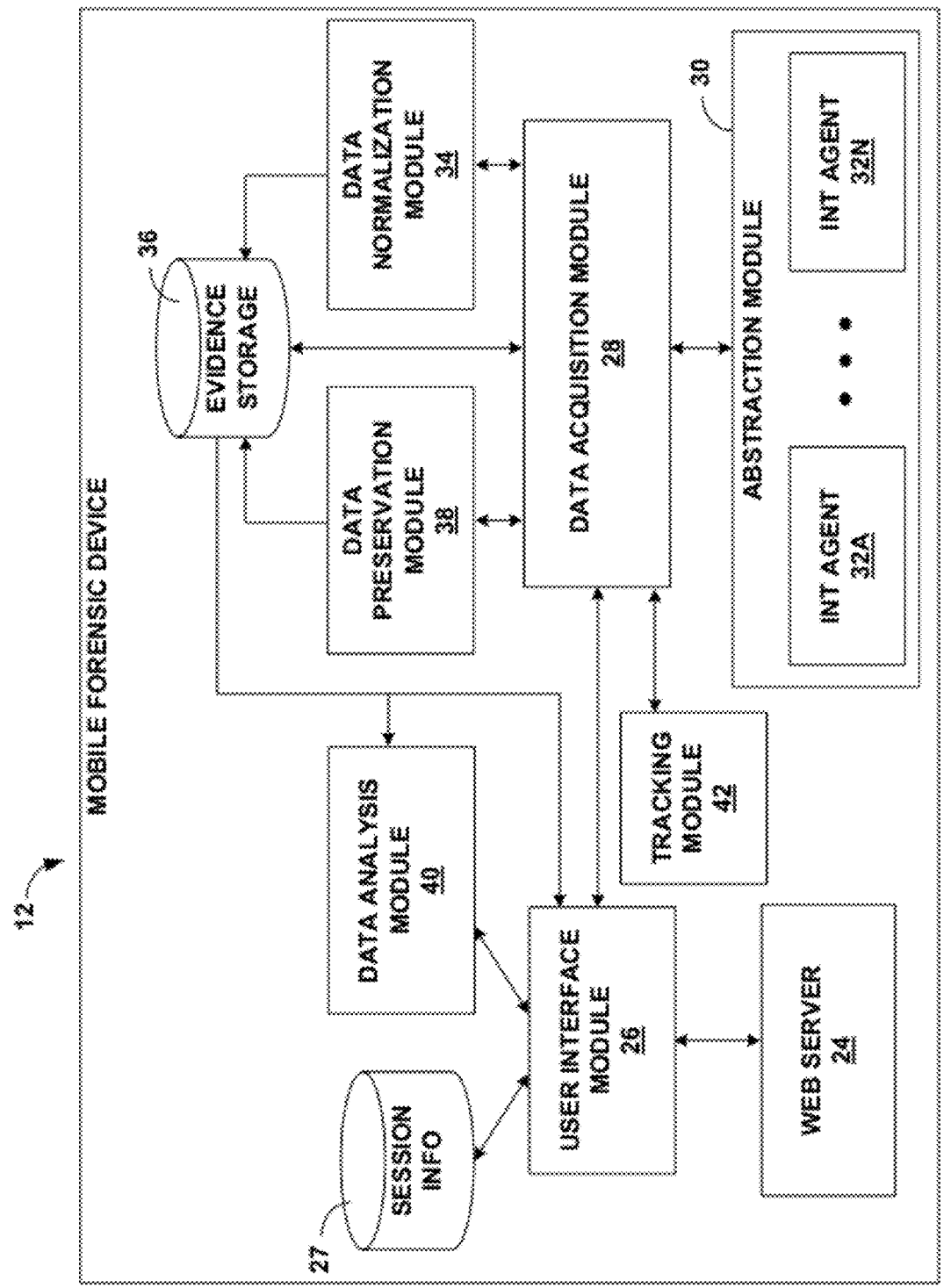
FIG. 4 is a block diagram illustrating an exemplary forensic device.

FIG. 4 is a block diagram illustrating forensic device 12 in further detail. As described above, forensic device 12 allows user 15 to remotely interrogate one or more target computing devices to acquire and analyze computer evidence that may be stored on the target computing devices.

Forensic device 12 may be connected to the same local subnet as target computing device 16, e.g., the same LAN as target computing device 16, allowing forensic device 12 and target computing device 16 to transfer data at a high speed. Specifically, forensic device 12 obtains an Internet Protocol (IP) address within the subnet scope of the LAN to which target computing device 16 is connected either dynamically via a protocol such as Dynamic Host Configuration Protocol (DHCP) or statically via configuration by a network administrator. Connecting forensic device 12 to the same local subnet as target computing device 16 permits forensic device 12 to have direct access to target computing device 16 without bypassing a local network firewall.

Forensic device 12 includes a web server 24 that provides a seamless, network-based interface by which remote user 15 accesses forensic device 12. More specifically, web server 24 provides a web-based interface by which user 15 interacts with forensic device 12 via a network, either public or private. In one configuration, web server 24 executes web server software to provide an environment for interacting with user 15 via a user interface module 26. User interface module 26 may include Common Gateway Interface (CGI) programs and a graphical user interface (GUI) generator for generating and presenting user interfaces to user 15. In various embodiments, the interface presented by forensic device 12 may include combinations of "server-side" user interface modules executing on web server 24 and "client-side" user interface modules, such as ActiveX® controls, JavaScripts™, and Java™ Applets, that execute on client device 14.

User 15 may connect to forensic device 12 via a computer network using a web browser. User 15 may, for instance, connect to forensic device 12 using the IP address assigned to forensic device 12, e.g., using the IP address in a Uniform Resource Locator (URL) such as https://12.34.56.78/MFP/index.html. Forensic device 12 presents user 15 with a user interface for logging into forensic device 12. Forensic device 12 receives login data from user 15, such as a username and password, to verify the identity of user 15. Alternatively, forensic device 12 may authenticate user 15 using a digital certificate. The connection through which user 15 connects to forensic device 12 may be a secure connection through the network such that all the data sent between forensic device 12 and user 15 is encrypted to prevent unauthorized access to the data.

Once user 15 is logged into forensic device 12, forensic device 12 presents user 15 with a list of current forensic inquiries, as well as an option to create a new forensic inquiry. User 15 may create a new forensic inquiry to acquire data, e.g., computer evidence, from target computing device 16. Forensic device 12 presents user 15 with one or more input screens to allow the user to input information necessary for the creation of the new forensic inquiry. Forensic device 12 may, for example, require user 15 to input case information to associate the new forensic inquiry with an ongoing case as well as target device information specifying a target device of the new inquiry. The case information may include, for example, a case number, case name, principle investigator, location to store the collected data, and a time zone for data and time reporting. Target device information may include a target device host name, IP address, operating system, access methods and password. Forensic device 12 generates a new forensic inquiry based on the information input by user 15 and stores the inquiry data, e.g., case information and target device information, in session information 27.

Forensic device 12 presents to user 15 a set of possible acquisition operations that forensic device 12 may perform for the newly defined inquiry. The initial acquisition operations include, for example, acquiring log files, communication statistics, e.g., Ethernet and protocol statistics, general system data, running process information, open network ports and associated processes, account information, file sharing information, and TCP/IP network information, and the like. User 15 may select a subset, all or none of the initial acquisition operations to be initially performed to acquire state information of the target computing device as well as files and additional computer evidence. For example, user 15 may check a box located adjacent the acquisition operation to select the acquisition operation.

As described above, forensic device 12 interrogates the target device defined by user 15 to acquire the computer evidence wanted by user 15. More specifically, forensic device 12 includes a data acquisition module 28 and an abstraction module 30 that cooperate to acquire data from target computing device 16. Data acquisition module 28 notifies abstraction module 30 of the one or more acquisition operations to perform, and abstraction module 30 performs the acquisition operations to acquire the computer evidence from target computing device 16.

Particularly, abstraction module 30 includes interrogation agents 32A-32N ("interrogation agents 32") that initiate acquisition operations based on the operating system executing on target computing device 16 and the type of computer evidence desired using one or more of the access methods defined in the corresponding forensic inquiry. Each of interrogation agents 32 is configured to communicate with a particular type of operating system, e.g., Windows 2000®, Windows NT®, Unix®, MacOS™ and the like, via a number of executable files and a remote command execution tool. Particularly, the remote execution tool may relay the appropriate executable files to target computing device 16 to obtain the data indicated by data acquisition module 28. In this manner, abstraction module 30 provides a layer of "abstraction" between interrogation agents 32 and data acquisition module 20, thereby allowing forensic device 12 to be platform independent. As a result, forensic device 12 may acquire data from a target device regardless of the type of operating system executing on the target device. Abstraction module 30 selectively invokes the appropriate interrogation agents 32 based on the input from remote user 15 identifying the operating system of target computing device 16.

Abstraction module 30 may further acquire data from target computing device 16 using different access methods based on the type of data to be acquired from target computing device 16. For example, forensic device 12 may perform an acquisition operation to acquire a log file via WMI while performing an acquisition operation to acquire network protocol statistics via SMB. Abstraction module 30 may be preconfigured to use specific access methods for acquiring specific types of data or user 15 may identify access methods for each of the acquisition operations.

Abstraction module 30 and, more particularly, a respective one of interrogation agents 32 may perform the specified combination of acquisition operations in a particular order to reduce the impact the operations on other data stored within target computing device 16, thereby maintaining an ensuring the integrity of the data. In other words, some of the acquisition operations can cause other data stored within target device 16 to change. For example, acquisition operations performed prior to the acquisition operation to acquire a log file may result in additional entries in the log file when later acquired. In this case, the acquisition operation to acquire log files should be performed early in the acquisition process to reduce the amount of change to the data.

In one embodiment, forensic device 12 may acquire an "image" of one or more disks attached to target computing device 16 remotely via the communication link between forensic device 12 and target computing device 16. The image is an exact copy ("bitstream copy" or "mirror") of all data on the disks, including data not normally visible via the operating system of target computing device 16. In addition, the image may also include an exact copy of memory (RAM) or memory swap space of target computing device 16. The image may be acquired by using software on target computing device 16 that performs a direct low-level read of the disks and/or memory of target computing device 16, then communicating the image to forensic device 12 via SMB or the like. Target computing device 16 continues to operate while forensic device 12 acquires the disk image, memory image, or both.

Forensic device 12 stores an original copy of the acquired data in an evidence storage database 36. In addition, forensic device 12 includes a data normalization module 34 that normalizes the acquired data, i.e., converts the acquired data to a standard format, to allow analysis tools to work on multiple types of data. For example, normalizing the acquired data allows the analysis tools to simultaneously analyze data acquired from target computing devices having different operating systems, target computing devices running in different time zones, and the like. Data normalization module 34 may, for instance, convert timestamp data from a local time zone of target device 16 to a standard time zone, e.g., UTC, or the time zone of forensic device 12. In another example, data normalization module 34 may normalize the clock of target computing device 16 to that of forensic device 12. In addition, data normalization module 34 may convert data that has host names and IP addresses to one or the other, not a mix. Normalized and original copies of the acquired data are stored in evidence storage database 36.

Further, forensic device 12 includes a data preservation module 38 to create a record for proving the integrity and authenticity of the acquired data. Data preservation module 38 may, for example, compute a checksum of the acquired data using a cryptographic hash, such as an MD5 hash, and store the hash value within evidence storage database 36. The cryptographic hash can be applied to data of an arbitrary length to produce an output "fingerprint." In the example of the MD5 hash, the output is a 128-bit "fingerprint" that is computationally infeasible to duplicate using a different set of data. Forensic device 12 may prove the integrity of the data by reapplying the cryptographic hash to the original data at a future time to obtain a fingerprint and comparing the fingerprint to the fingerprint taken at the time the data was acquired. In this manner, the user may prove the integrity and authenticity of the data at a future time to help ensure that the evidence is admissible in a legal proceeding. Additionally, data preservation module 38 may store information about the acquisition, such as the exact commands run during the acquisition, the date and time of the acquisition, the investigator who conducted the acquisition, and the like.

Forensic device 12 includes a data analysis module 40 that provides one or more data analysis tools to user 15 for viewing and analyzing the data. The data analysis tools may include, for example, a time analysis tool, a checksum verification tool, a file viewer, and network tools. As described, forensic device 12 may acquire data from target computing device 16 and allow user 15 to view and analyze the computer evidence on-line via the data analysis tools. In some cases, forensic device 12 may allow user 15 to view and analyze previously acquired computer evidence while forensic device 12 collects additional forensic evidence. In this manner, the collection and analysis of forensic evidence may be done in parallel. The time analysis tool may be used to analyze log files for tampering. As described above, log files include system event log, application event log, security event log, web server log files, Unix SYSLOG files, mail log files, accounting log files, and router flow log files, and other files that maintain a list of operations performed by target computing device 16. More specifically, the time analysis tool may analyze the log files to verify the log file entries are in chronological order, to detect anomalous gaps in the log entries, and to detect the absence of expected periodic log entries. The checksum verification tool allows user 15 to run the cryptographic hash on one or more files and compare the results with the fingerprint obtained upon acquisition of the original files. The file viewer presents data acquired from target device 16 to user 15. The file viewer may present the user with raw data, summaries of the data, or the like. The network tools allow user 15 to associate TCP/IP network connections with running processes, e.g., by port, by remote host name, or the like, can show all shared file systems to user 15, can show from which machines the target has drives/shares mounted, and the like. The analysis tools may interact with one another to provide user 15 with the ability to seamlessly move among various data types, e.g., files, processes, and the like. For example, user 15 can look at the TCP connection list, see a strange remote host, click on the associated local process, see a file open, and then acquire the file.

In embodiments in which forensic device 12 acquires an "image" of target computing device, data analysis module 40 may further provide tools for examining the acquired disk image or memory image to identify files, process or operating system data structures, boot information, or other structures on the image. In addition, forensic device 12 may contain custom or standard tools for extracting deleted files or directories from the disk image, viewing data hidden in unallocated space of the disk ("slack space"), or examining other information not normally available via the operating system of target machine 16.

After viewing and analyzing at least a portion of the acquired data, user 15 may determine whether acquisition of additional data is necessary. Data acquisition module 28 provides user 15 with the ability to acquire additional data from target computing device 16. Data acquisition module 28 may, for example, provide user 15 with the ability to acquire additional files or additional system state data from target computing device 16. For instance, user 15 may browse through a file directory of target computing device 16 and select a particular file, which abstraction module 30 acquires from target computing device 16. As with the other acquired data, the data file acquired by forensic device 12 is stored in original form, normalized, and associated with a hash value, i.e., fingerprint. User 15 continues to acquire, analyze and interpret data from target computing device 16 to determine additional steps that need to be taken. User 15 may, for instance, determine the necessity to seize target computing device 16, continue to monitor target computing device 16, or look for evidence elsewhere.

To further prove the authenticity of the evidence, a tracking module 42 maintains an audit log of every transaction performed during the inquiry process, including logging every file and data item downloaded from target computing device 16 and recording the browsing of the acquired data files by user 15 as well as analyses performed on the computer evidence. For example, the audit log may include a timestamp corresponding to each transaction, an investigator identifier corresponding to the investigator performing each transaction, and a description of each transaction. The audit log may be used to determine the impact that the investigation, i.e., the acquiring of computer evidence from target computing device 16, may have on other data stored on target computing device 16, which may aid in analysis of the acquired computer evidence as well as preserving the authenticity of the acquired computer evidence. For example, user 15 may access the audit log to illustrate the order in which the computer evidence was acquired from target computing device 16, the commands issued by forensic device 12, and the impact that each of the issued commands had on target computing device 16. Additionally, forensic device 12 may provide security measures to ensure that user 15 accesses only data necessary for the investigation and to ensure the appropriate use of forensic device 12. Data acquisition modules 28 may be configured, for example, to only perform "constrained" searches. In this manner, user 15 may have limited privileges within target computing device 16.

Figure 5:
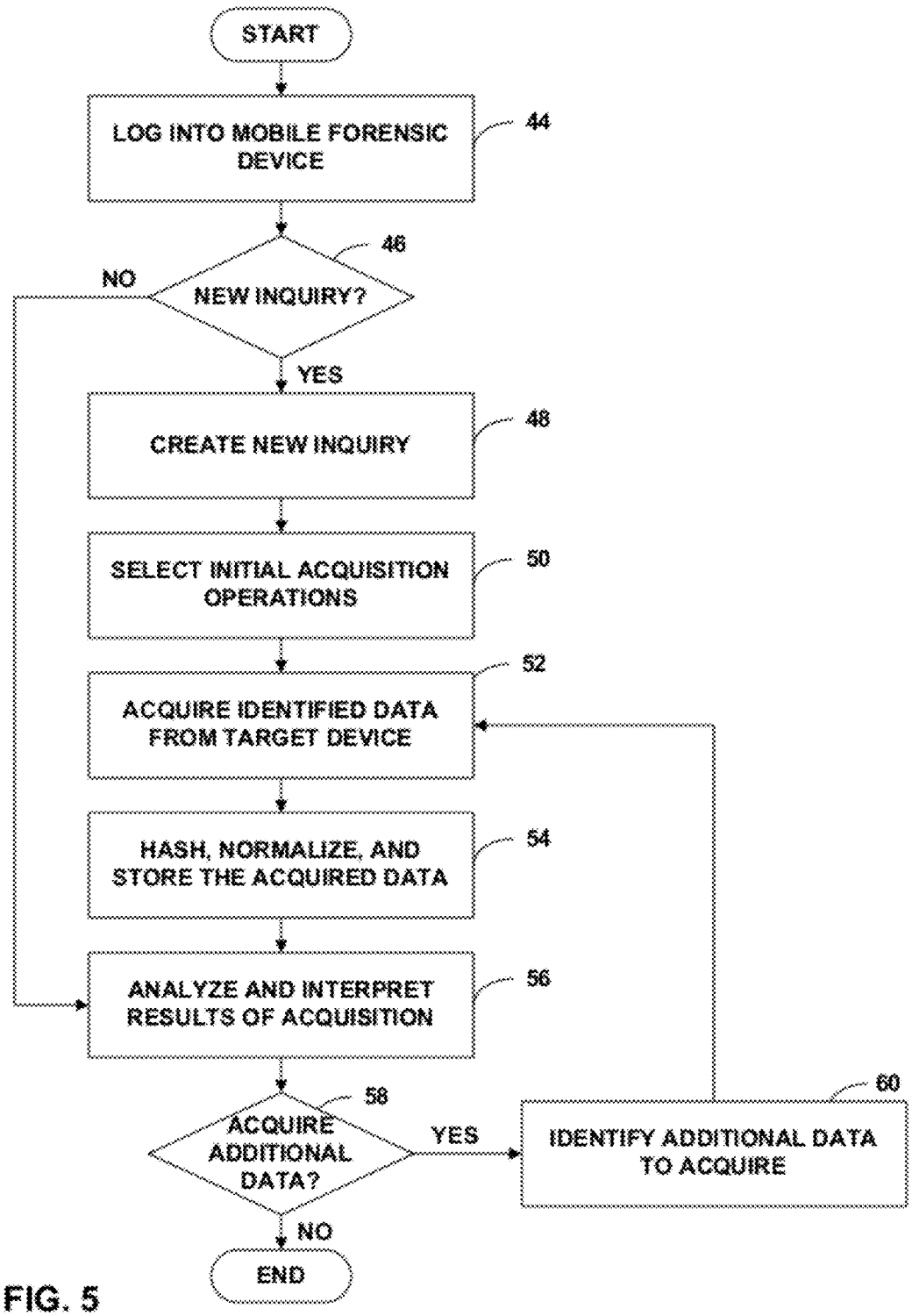
FIG. 5 is a flow diagram illustrating exemplary operation of a computer forensic system in acquisition and analysis of computer evidence of a target computing device.

FIG. 5 is a flow diagram illustrating exemplary operation of a computer forensic system 12 when acquiring and analyzing computer evidence from target computing device 16. Initially, user 15 connects to forensic device 12 via a web browser and inputs login information (44). For example, forensic device 12 may present user 15 with a user interface for inputting a username and password to log into forensic device 12. Alternatively, forensic device 12 may authenticate user 15 using a digital certificate or other digital credential.

Once user 15 is logged into forensic device 12, forensic device 12 presents user 15 with a user interface to select either a previous forensic inquiry or create a new forensic inquiry (46). If user 15 selects from a previously defined inquiry, user 15 analyzes and interprets the collected computer evidence (56). However, if user 15 does not select a previously defined forensic inquiry, forensic device 12 receives inquiry information from user 15 and creates a new forensic inquiry in accordance with the input (48). For example, forensic device 12 may present user 15 with one or more screens to allow user 15 to input information necessary for the creation of the new forensic inquiry. Forensic device 12 may, for example, receive case and target device information from user 15 via the user interface. The case information associates the new forensic inquiry with an ongoing case and the target device information specifies a target device of the new inquiry. Forensic device 12 generates a new forensic inquiry based on the data input by user 15 and stores the inquiry information, i.e., case information and target information, in session information 27.

User 15 selects initial acquisition operations for forensic device 12 to perform (50). For example, forensic device 12 may present a set of potential acquisition operations for the newly defined inquiry and user 15 selects a subset, all or none of the initial acquisition operations to be initially performed. For example, user 15 may check a box located adjacent the acquisition operation to select the acquisition operation. As described above, initial acquisition operations include, for example, acquiring log files, communication statistics, e.g., Ethernet and protocol statistics, general system data, running process information, open network ports and associated processes, account information, file sharing information, TCP/IP network information, timeline of file and state changes, and other file or state information.

Forensic device 12 interrogates the target device defined by user 15 to acquire data, i.e., computer evidence, from target computing device 16 (52). More specifically, forensic device 12 communicates commands to the operating system of target computing device 16 via one or more of the access methods defined in the corresponding forensic inquiry. For example, forensic device 12 may communicate commands associated with some acquisition operations to the operating system of target computing device 16 via WMI and commands associated with other acquisition operations to the operating system of target computing device 16 via SMB. Forensic device 12 may perform the initial acquisition operations in a particular order to reduce the impact the operations have on other data stored within target computing device 16.

Additionally, forensic device 12 stores an original copy of the acquired data in an evidence storage database 36, takes a checksum of the acquired data using a cryptographic hash to obtain a "fingerprint" for preserving the authenticity the acquired data, and normalizes the acquired data, i.e., converts the acquired data to a standard format (54).

User 15 may use data analysis tools provided by forensic device 12 to analyze and interpret acquired data, either data acquired by a new forensic inquiry or data acquired in a previous forensic inquiry (56). The data analysis tools may, for example, allow user 15 to analyze log files for tampering by verifying the log file entries are in chronological order, detecting anomalous gaps in the log entries, or detecting the absence of expected periodic log entries. The data analysis tools may also allow user 15 to view data acquired from target computing device 16. User 15 may view the raw acquired data, summaries of the acquired data, or the like. After analyzing and interpreting the acquired data, user 15 may determine whether acquisition of additional data is necessary (58). When user 15 determines additional data is necessary, user 15 specifies additional files or system state data to acquire from target computing device 16 and forensic device 12 acquires the identified data from target computing device 16 (60, 52). Forensic device 12 may acquire additional data from target computing device 16 and allow user 15 to view and analyze the data on-line with the data analysis tools. In this manner, user 15 does not have to go off-line to analyze the acquired computer evidence. In some cases, forensic device 12 may allow user 15 to view and analyze previously acquired computer evidence while forensic device 12 collects additional forensic evidence. In this manner, the collection and analysis of forensic evidence may be done in parallel.

Figure 6:
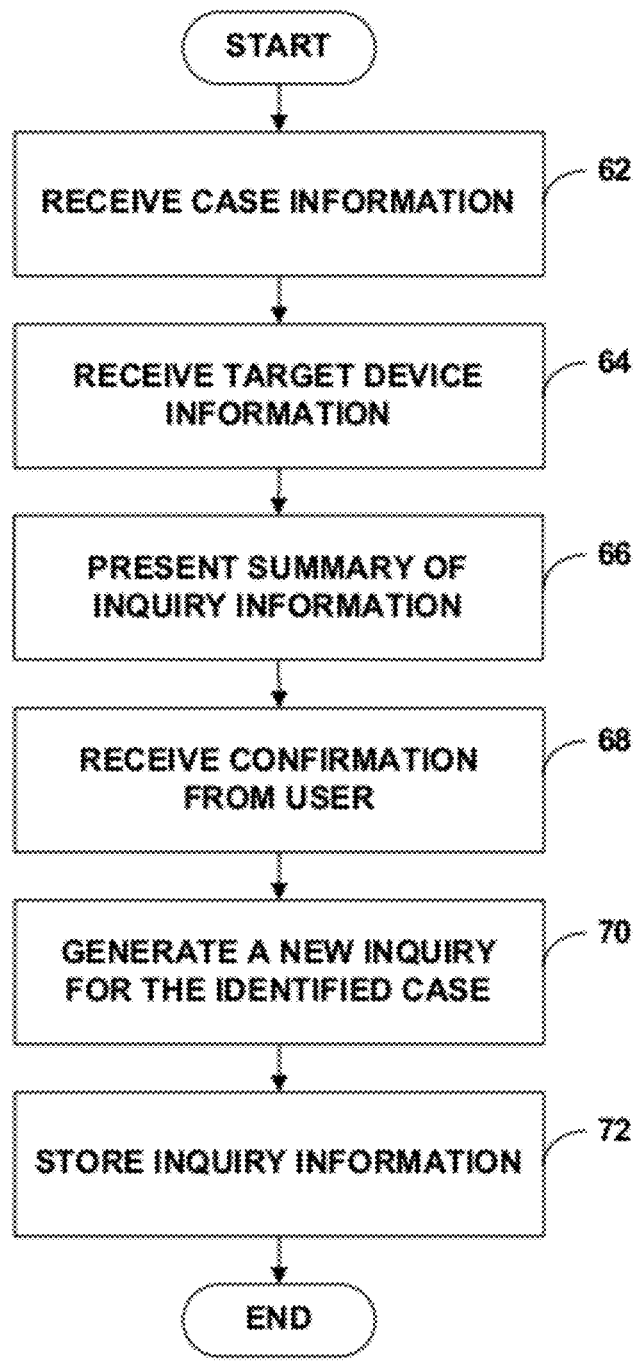
FIG. 6 is a flow diagram illustrating exemplary operation of a forensic device in creation of a new forensic inquiry.

FIG. 6 is a flow diagram illustrating exemplary operation of forensic device 12 creating a new forensic inquiry. Initially, forensic device 12 receives case information and target device information from user 15 via one or more user interfaces (62, 64). Forensic device 12 may present user 15 with a series of user interfaces that include input areas for user 15 to input the case and target device information. Alternatively, forensic device 12 may present user 15 a single user interface, which the user may interact with to input the case information and target device information.

Forensic device 12 presents a confirmation user interface to user 15 that summarizes the inquiry information, i.e., the case and target device information, previously input by user 15 (66). Upon review of the inquiry information summary, forensic device 12 receives a confirmation from user 15 that the data as input is correct (68). Forensic device 12 automatically generates the new forensic inquiry associated with the identified case and stores the inquiry information in session information 27 (70, 72).

Figure 7:
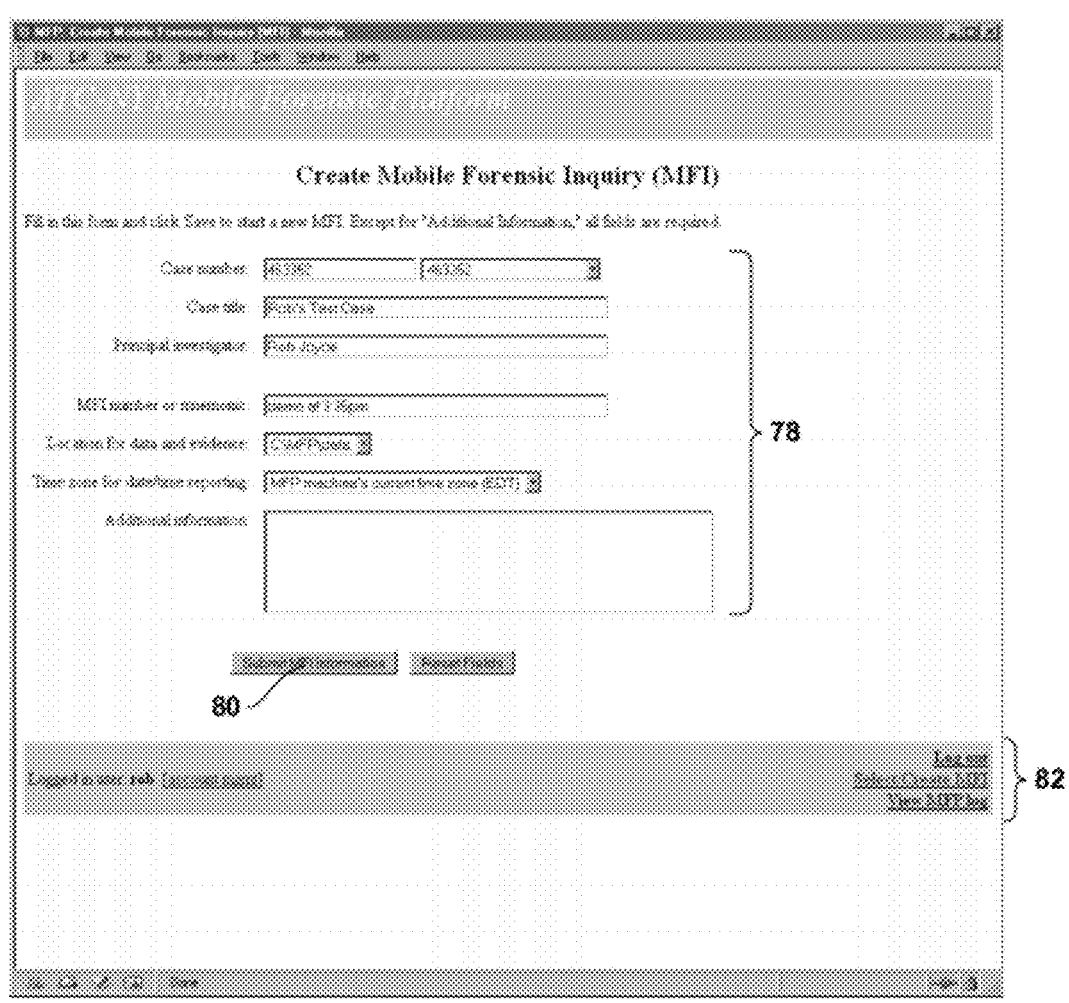
FIG. 7 is a screen illustration of an exemplary user interface presented by the forensic device for capturing case information from a remote user.
Figure 8:
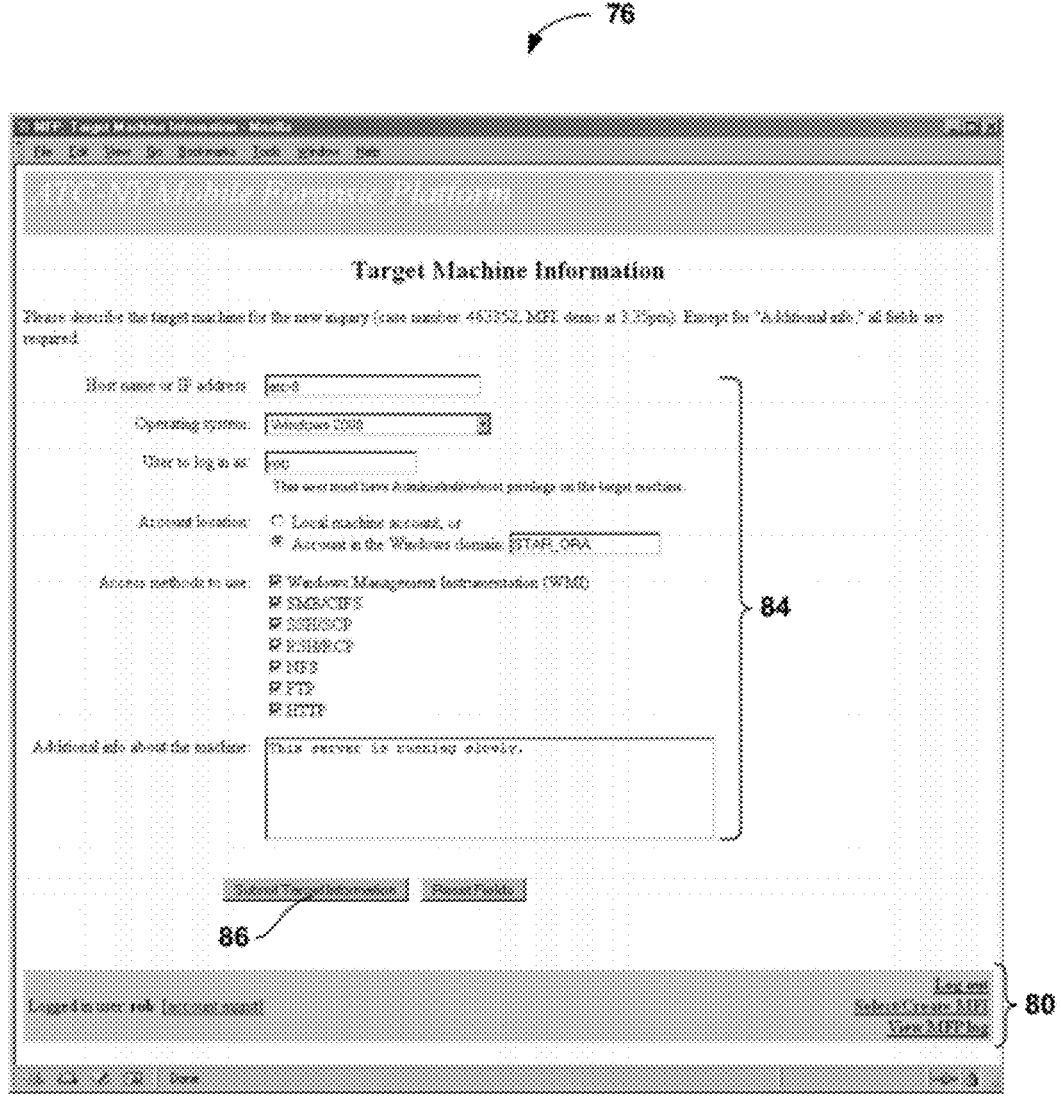
FIG. 8 is a screen illustration of an exemplary user interface presented by the forensic device for capturing target device information from the user.

FIG. 7 and FIG. 8 are screen illustrations of example user interfaces with which user 15 interacts to create a forensic inquiry. Specifically, FIG. 7 is a screen illustration of an exemplary user interface 74 that allows user 15 to input case information. FIG. 8 is a screen illustration of an exemplary user interface 76 that allows user 15 to input target device information.

Forensic device 12 may present user interfaces 74 and 76 to user 15 as a series of screens with either one of the screens being presented first. Although illustrated as two separate screens, forensic device 12 may present user 15 a single user interface, which the user may interact with to input inquiry information, i.e., case information and target device information.

User interface 74 includes an input area 78 that includes input boxes for entering the case information. Specifically, input area 78 of user interface 74 includes input boxes for inputting a case number, case title, principal investigator, forensic inquiry number or mnemonic, storage location for data and evidence, time zone for date/time reporting, and additional information. As illustrated in FIG. 7, some of the input boxes may be textual boxes that user 15 inputs text into and others may be pull down menus that provide a list of options. For example, the pull down menu associated with the input box for time zone information may present user 15 with a list of all possible time zones across the world. Upon inputting the case information into user interface 74, user 15 may actuate a "submit information" button 80 to proceed to user interface 76 illustrated in FIG. 8.

User interface 74 also includes an action area 82 that includes links that user 15 can click on to perform different actions. Action area 82 of user interface 74 includes a "log out" link that exits user 15 from forensic device 12, a "select/create" link that takes user 15 to a screen that illustrates a list of all inquiries, and a "view log" link that takes user 15 to an audit log of transactions performed by user 15 or other users of the forensic device 12.

User interface 76 of FIG. 8 includes an input area 84 that includes input boxes for user 15 to enter target device information. Specifically, input area 84 of user interface 76 includes input boxes for inputting a host name or IP address, an operating system, a user to log in as, an account location, one or more access methods to use, and additional information about the target machine. The input boxes of user interface 76, like the input boxes of user interface 74, may be textual boxes that user 15 inputs text into, pull down menus that provide a list of options, or the like. Upon inputting the target device information into user interface 76, user 15 may actuate the "submit target information" button 86 to create the forensic inquiry.

User interface 76 also includes an action area 80 that includes links that user 15 can click on to perform different actions, e.g., a "log out" link that exits user 15 from forensic device 12, a "select/create" link that takes user 15 to a screen that illustrates a list of all inquiries, and a "view log" link that takes user 15 to an audit log of transactions performed by user 15 or other users of the forensic device 12.

Forensic device 12 automatically generates a forensic inquiry in accordance with the case and target device information submitted by user 15. For instance, forensic device 12 generates a forensic inquiry for case number 463352: Rob's Test Case, which has Rob Joyce as a principal investigator. The evidence acquired from target device atc-8 will be stored at C:\MFP\data\463352_demoat335_pm_FSCindRA. Target device atc-8 has a Windows® 2000 operating system and forensic device 12 will acquire the data using at least one of Windows Management Instrumentation (WMI), Server Message Block (SMB), Secure Shell (SSH), Remote Shell (RSH), Network File System (NFS), Apple Filing Protocol (AFP), File Transfer Protocol (FTP), and Hypertext Transfer Protocol (HTTP).

Figure 9:
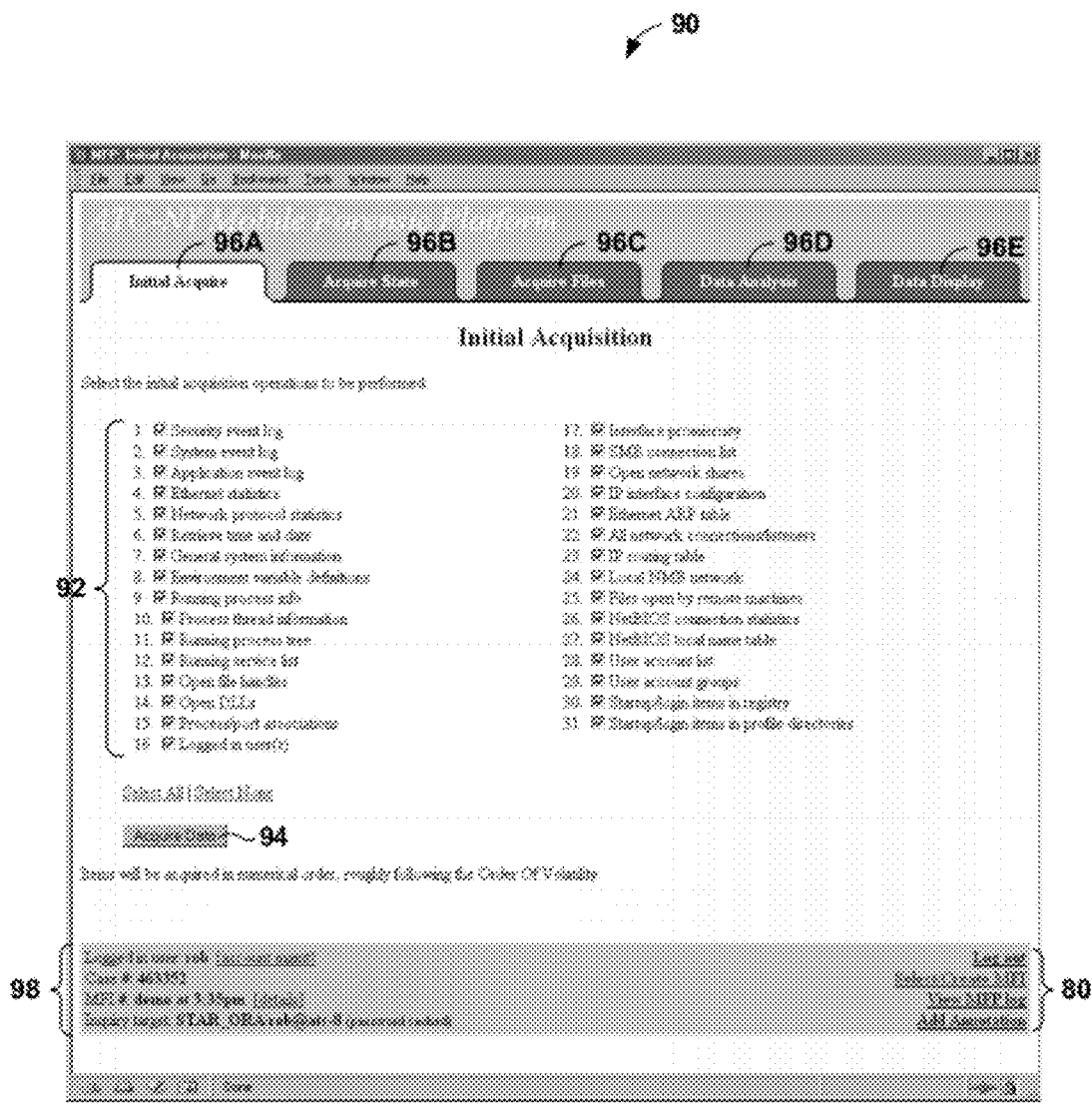
FIG. 9 is a screen illustration of an exemplary user interface with which the remote user interacts to specify a combination of acquisition operations.

FIG. 9 is a screen illustration of an exemplary user interface 90 with which user 15 interacts to specify a combination of one or more acquisition operations for forensic device 12 to perform. User interface 90 includes an acquisition operation selection area 92, which user 15 interacts with to select one or more acquisition operations from the comprehensive set. Acquisition operation selection area 92 includes a list of acquisition operations with a box adjacent each of the acquisition operations. In this embodiment, user 15 clicks on the boxes adjacent the acquisition operations user 15 wants forensic device 12 to perform. In the example illustrated in FIG. 9, user 15 has selected all of the acquisition operations, represented by the check marks within the selection boxes. In some embodiments, acquisition selection area 92 may have different methods for selecting the acquisition operations. For example, the acquisition operation selection area may include a list of acquisition operations and user 15 may drag desired acquisition operations from the list into a "perform acquisition operation" region. Once user 15 has selected the acquisition operations for forensic device 12 to perform, user 15 may actuate an "acquire data" button 94 to initiate the initial data acquisition.

The acquisition operations listed in acquisition selection area 92 may be arranged and presented to user 15 in an order of "volatility" or impact the acquisition operation may have on the target computing device 16. In other words, forensic device 12 may list the acquisition operations according to the order in which the acquisition operations will be performed. As described above, forensic device 12 may perform the acquisition operations in a particular order to reduce the impact the acquisition operations have on other data stored within target computing device 16. Alternatively, the acquisition operations may be presented in no particular order, but upon actuation of acquire data button 94, forensic device 12 may determine an order in which the acquisition operations are performed to reduce the impact the acquisition operations have on other data stored within target computing device 16.

User interface 90 further includes operation mode tabs 96A-96E ("operation mode tabs 96"). Operation mode tabs 96 correspond to different data acquisition and analysis operation modes of forensic device 12. Clicking on one of operation mode tabs 96 presents user 15 a user interface for the data acquisition or analysis operation mode associated with the respective operation tab 96. Particularly, operation tab 96A corresponds to the initial acquisition, operation tab 96B corresponds to acquisition of additional machine state information, operation tab 96C corresponds to acquisition of files from target device 16, operation tab 96D corresponds to data analysis tools for analyzing acquired data, and operation tab 96E corresponds to data viewing tools for displaying acquired data.

User interface 90 also includes an inquiry summary section 98 that illustrates to user 15 inquiry information associated with the forensic inquiry that is currently in session. Inquiry summary section 98 of FIG. 9 identifies the case number, the forensic inquiry mnemonic, and the inquiry target. Additionally, user interface 90 includes an action area 80 that includes links that user 15 can click on to perform different actions, e.g., a "log out" link that exits user 15 from forensic device 12, a "select/create" link that takes user 15 to a screen that illustrates a list of all inquiries, a "view log" link that takes user 15 to an audit log of transactions performed by user 15 or others, a "add annotation" link that allows user 15 to add comments.

Figure 10:
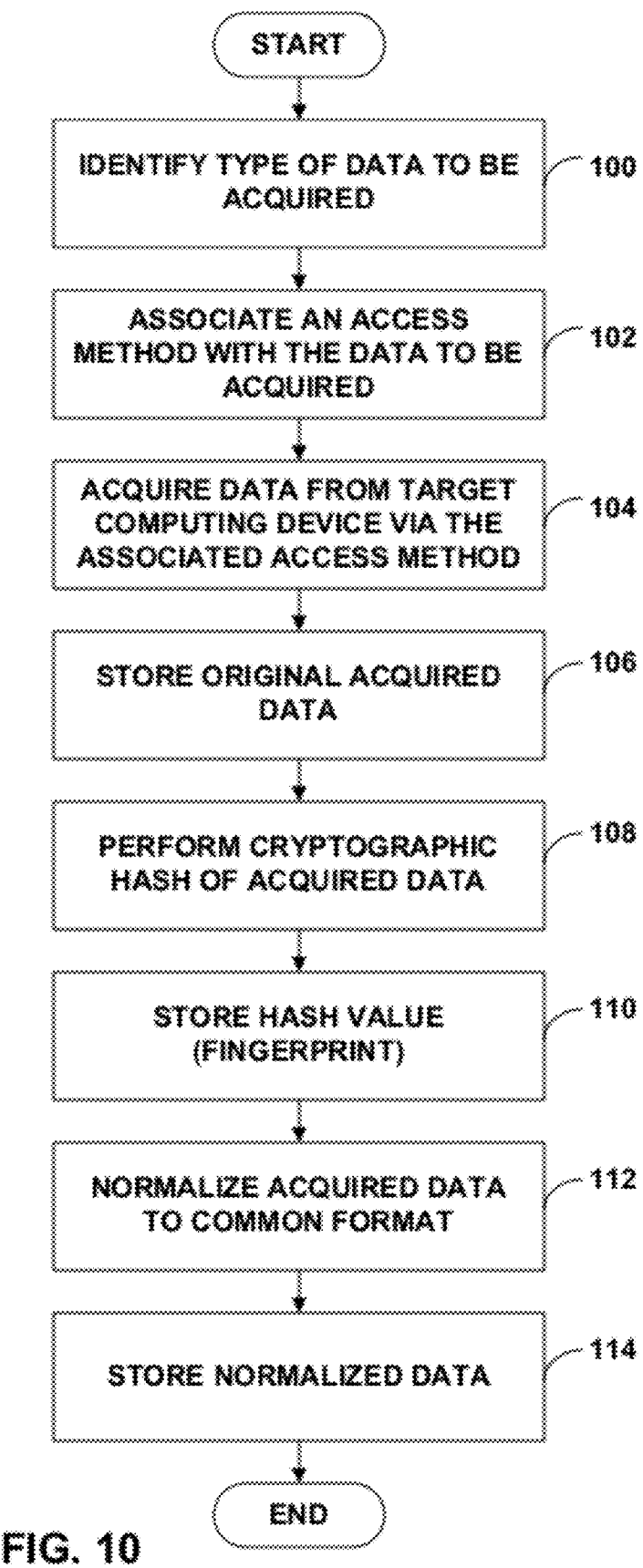
FIG. 10 is a flow diagram illustrating exemplary operation of the forensic device acquiring and storing data from the target computing device.

FIG. 10 is a flow diagram illustrating exemplary operation of forensic device 12 acquiring and storing data from target computing device 16. Initially, forensic device 12 identifies the type of data to be acquired by an associated acquisition operation (100). For example, forensic device 12 may identify that the first acquisition operation is for acquiring a log file. Forensic device 12 associates an access method with the type of data to be acquired by the acquisition operation (102). For instance, forensic device 12 may determine that the most effective access method for acquiring the log file is via WMI. Forensic device 12 acquires the data from target computing device 16 via the associated access method (104). More specifically, forensic device 12 communicates commands corresponding to the acquisition operation to the operating system of target computing device 16 via the access method to acquire the data.

Forensic device 12 stores a copy of the original acquired data in an evidence storage database 36 (106). Additionally, forensic device 12 performs a checksum on the acquired data using a cryptographic hash, such as an MD5 hash, and stores the hash value within evidence storage database 36 (108, 110). The cryptographic hash inputs the acquired data and produces an output "fingerprint" is computationally infeasible to duplicate using a different set of data. In this manner, forensic device 12 may preserve the authenticity of the data. In other words, user 15 can prove the integrity of the data by reapplying the cryptographic hash to the original data to obtain a fingerprint and comparing the fingerprint to the fingerprint taken at the time the data was acquired.

In addition, forensic device 12 normalizes the acquired data, i.e., converts the acquired data to a standard format, and stores the normalized data (112, 114). Normalizing the acquired data allows the analysis tools to work on data acquired from different operating systems, target computing devices running in different time zones, and the like. Forensic device 12 may, for instance, convert timestamp data from a local time zone of target device 16 to a standard time zone, e.g., UTC. In another example, forensic device 12 converts data that has host names and IP addresses to all one format, i.e., either all host names or all IP addresses. Normalization, however, changes the data, which is why acquisition module 28 stores an original copy in evidence storage database 36.

Figure 11:
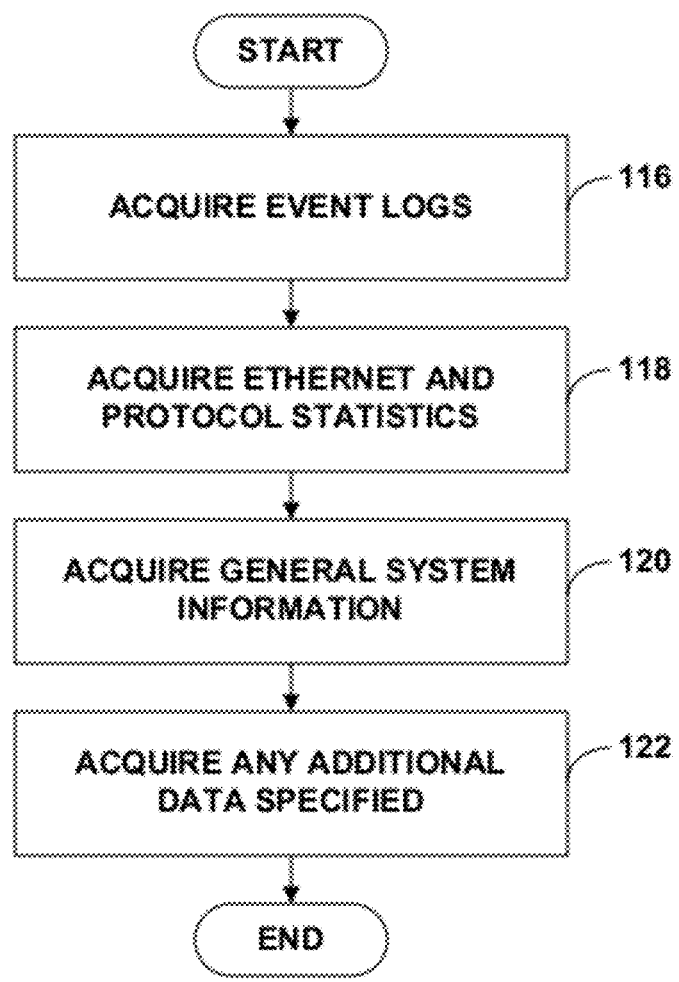
FIG. 11 is a flow diagram illustrating exemplary operation of the forensic device when invoking the specified acquisition in a particular order to reduce the impact the acquisition operations on other evidence.

FIG. 11 is a flow diagram illustrating an exemplary order of operations of forensic device 12 to acquire data from target computing device 16 to reduce the impact the acquisition operations have on other data stored within target computing device 16. In other words, the acquisition operations are performed such that the data that is most volatile is acquired first.

As described above, some acquisition operations may have dependencies on other acquisition operations. In other words, a command associated with one acquisition operation may affect the output of another command associated with another acquisition operation. Forensic device 12 may relay commands associated with the acquisition operations to target computing device 16 in a particular order to reduce the affects of these dependencies.

Initially, forensic device 12 relays commands associated with one or more acquisition operations for acquiring one or more log files (116). More specifically, forensic device 12 communicates the commands to target computing device 16. Forensic device 12 may, for example, relay commands to target computing device 16 to acquire an application log file, security log file, system log file, or a combination thereof. Executing other acquisition operations prior to executing the log file acquisition operation may result in additional log entries due to the other acquisition operations. Further, executing the log file acquisition operation should have no dependence on any future acquisition operations.

Forensic device 12 issues commands associated with the acquisition operations for acquiring communication statistics, e.g., Ethernet and protocol statistics, to target device 16 after performing the one or more log file acquisition operations (118). As described above, executing other acquisition operations prior to the acquisition operations associated with the retrieval of Ethernet and protocol statistics may result in an increase in the statistical numbers retrieved. As with the log file acquisition operations, the acquisition operations associated with acquiring the Ethernet and network protocol statistics should have limited effect on future acquisition operations.

Forensic device 12 relays commands associated with the acquisition operations for acquiring general system information, including time and date, after performing the acquisition operations associated with acquiring Ethernet and protocol statistics (120). Executing other acquisition operations prior to the acquisition operations for acquiring general system information may affect the system uptime, which may be compensated for if necessary. However, for aesthetic reasons, commands associated with acquisition operations to acquire general system information, including time and date, should be executed early in the initial acquisition and have little effect on future acquisition operations.

Forensic device 12 executes the rest of the acquisition operations after acquiring the general system information (122). The additional acquisition operations include acquisition operations for acquiring running process information, open network ports and associated processes, account information, file sharing information, TCP/IP network information, and timeline of file and state changes. A more detailed list of acquisition operations is illustrated in acquisition operations selection area 92 of user interface 90 of FIG. 9.

Although forensic device 12 is described above as executing the acquisition operations in a particular order, forensic device 12 may execute the acquisition operations in a slightly different order while still reducing the affects of the dependencies on the other acquisition operations. For example, the Ethernet and protocol statistics may be obtained prior to the log files. However, the acquisition operations for acquiring running process information, open network ports and associated processes, account information, file sharing information, TCP/IP network information, and timeline of file and state changes should be run after the acquisition operations for acquiring log files, Ethernet and protocol statistics, and general system information.

Figure 12:
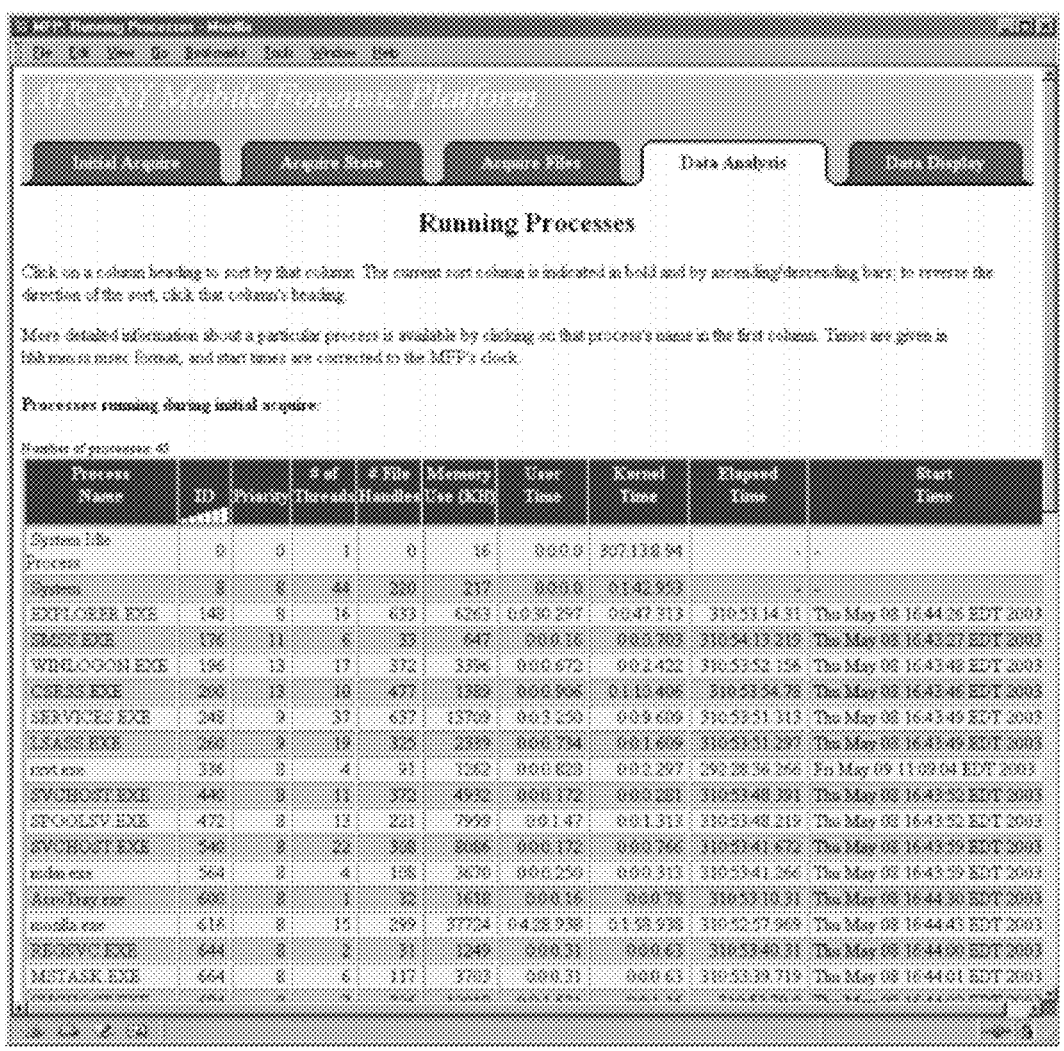
FIG. 12 is a screen illustration of an exemplary user interface for viewing evidence acquired from a target computing device.

FIG. 12 is a screen illustration of an exemplary user interface 126 for viewing data acquired from target computing device 12. In the example illustrated in FIG. 12, user interface 126 presents running process data acquired from target computing device 16. Specifically, user interface 126 includes a chart that includes a list of processes, and for each process lists an ID and priority, number of threads, number of file handles, memory use in kilobytes, user time, kernel time, elapsed time, and start time. User 15 may click on the process name to obtain more detailed information regarding the process.

Figure 13A:
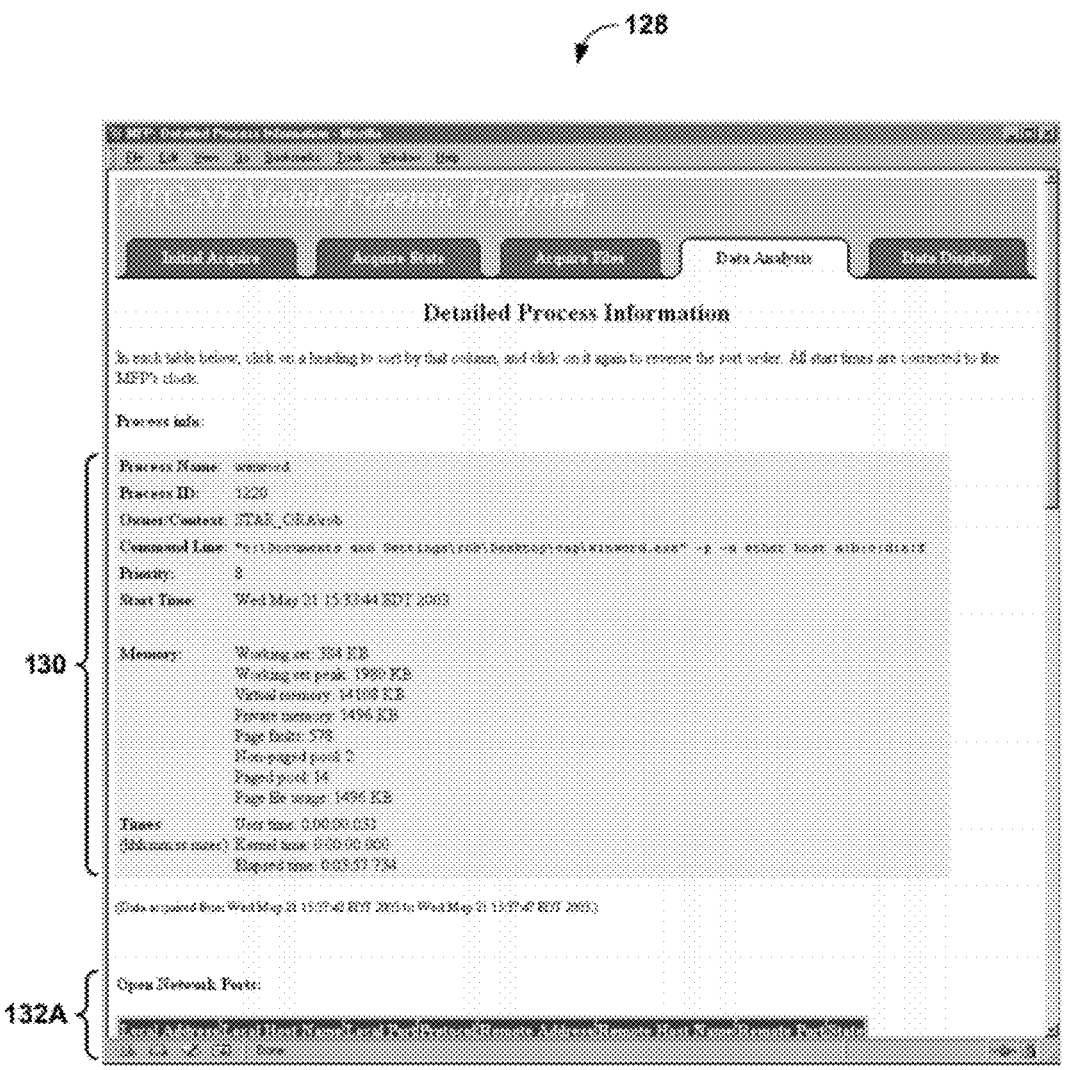
Figure 13B:
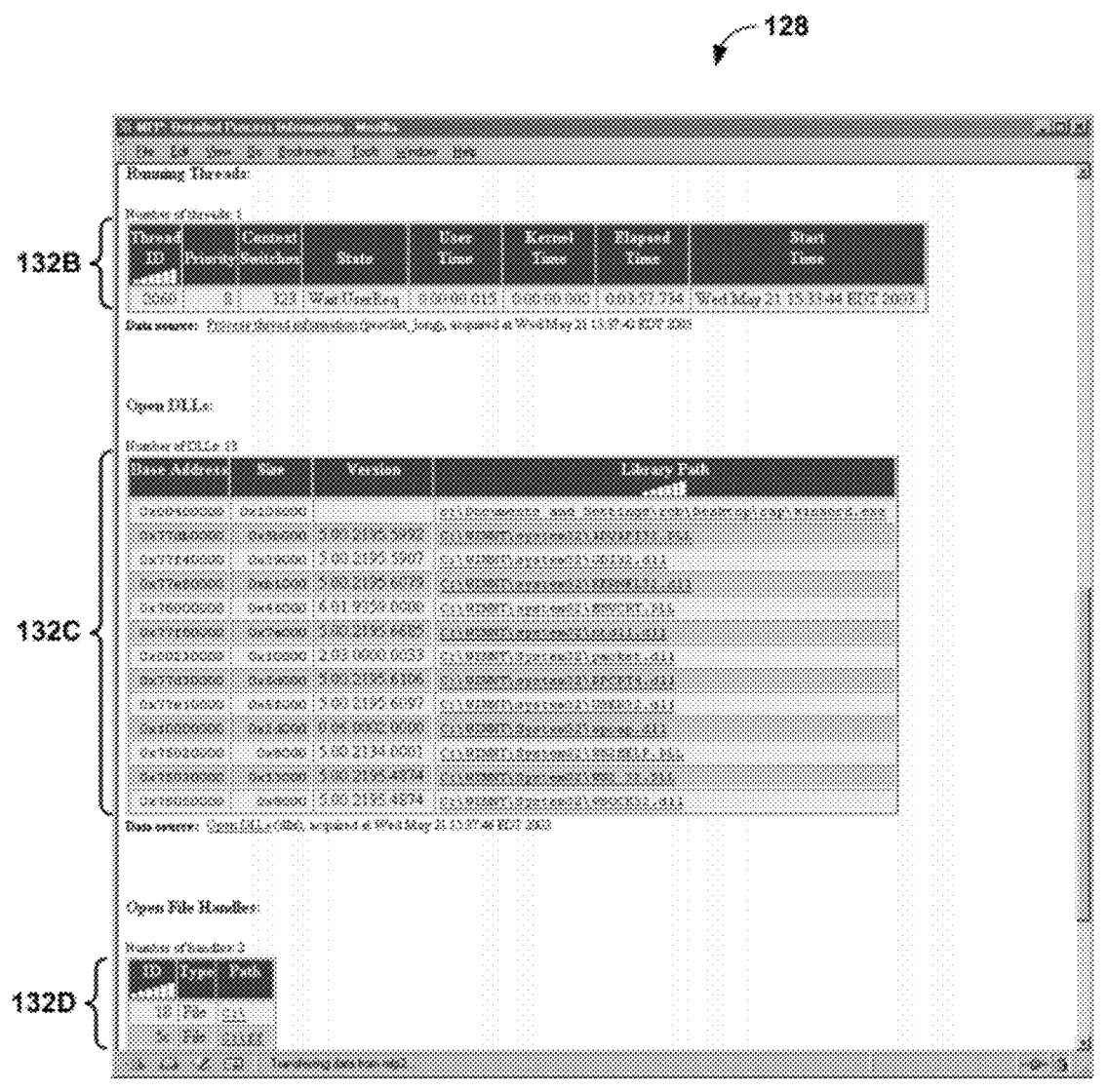

FIGS. 13A and 13B are screen illustrations of an upper and lower portion of an exemplary user interface 128 presented to user 15 upon clicking on a process name in user interface 126. More specifically, in this example, user interface 128 shows process WINWORD in detail. As illustrated in FIG. 13A, user interface 128 includes a process information section 130 that includes process name, ID, owner/context, command line, priority, start time, memory usage, and different times, e.g., user, kernel, and elapsed. As illustrated in FIGS. 13A and 13B, a lower region of user interface 128 shows charts 132A-132D ("charts 132") of different process attributes such as an open network port chart, a running thread chart, open DLL chart, and open file handle chart. User interface 128 may include numerous other charts illustrating other process attributes, such as an open network port chart.

Figure 14:
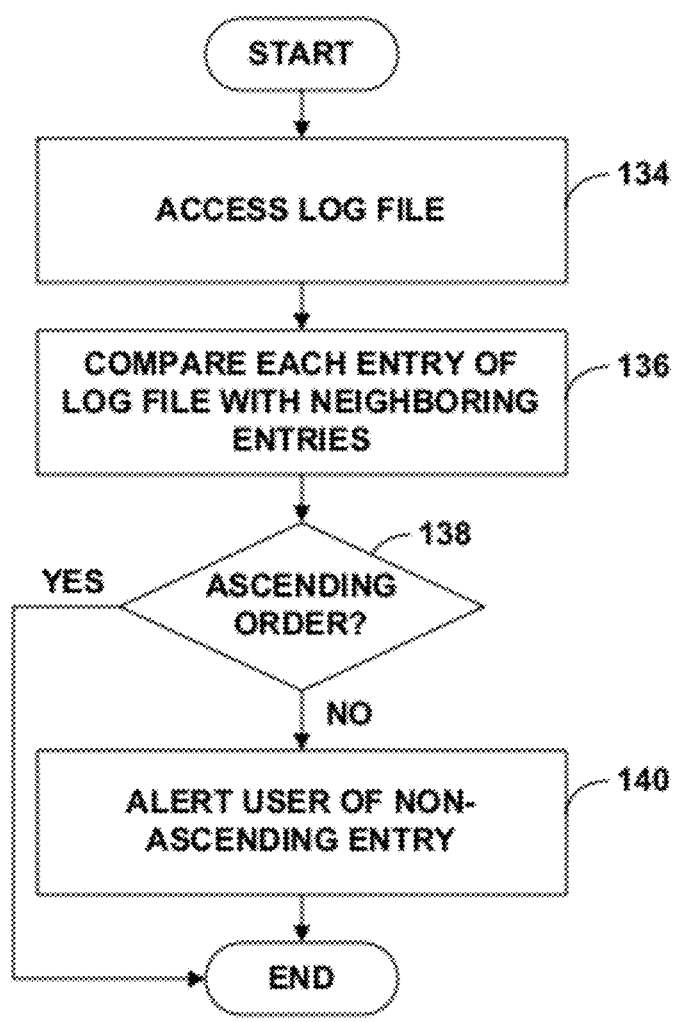
FIG. 14 is a flow diagram illustrating an exemplary analysis script for detecting log file tampering.

FIG. 14 is a flow diagram illustrating an exemplary analysis script for detecting log file tampering of a log file acquired from target computing device 16. Initially, forensic device 12 accesses a log file acquired from target computing device 16 (134). Forensic device 12 compares each of the entries of the log file with neighboring entries, i.e., the entry immediately prior to and immediately following the entry of interest (136). Based on the comparison, forensic device 12 determines whether the entries are in ascending order, i.e., chronological order (138). When the entries are in chronological order, forensic device 12 continues on to the next entry and compares the entry with the neighboring entries until all of the entries of the log file have been verified to be in ascending order. However, when entries within the log file are determined to be out of ascending order, forensic device 12 alerts user 15 of the non-ascending entries (140). Forensic device 12 may, for example, display the non-ascending entries to user 15.

Figure 15:
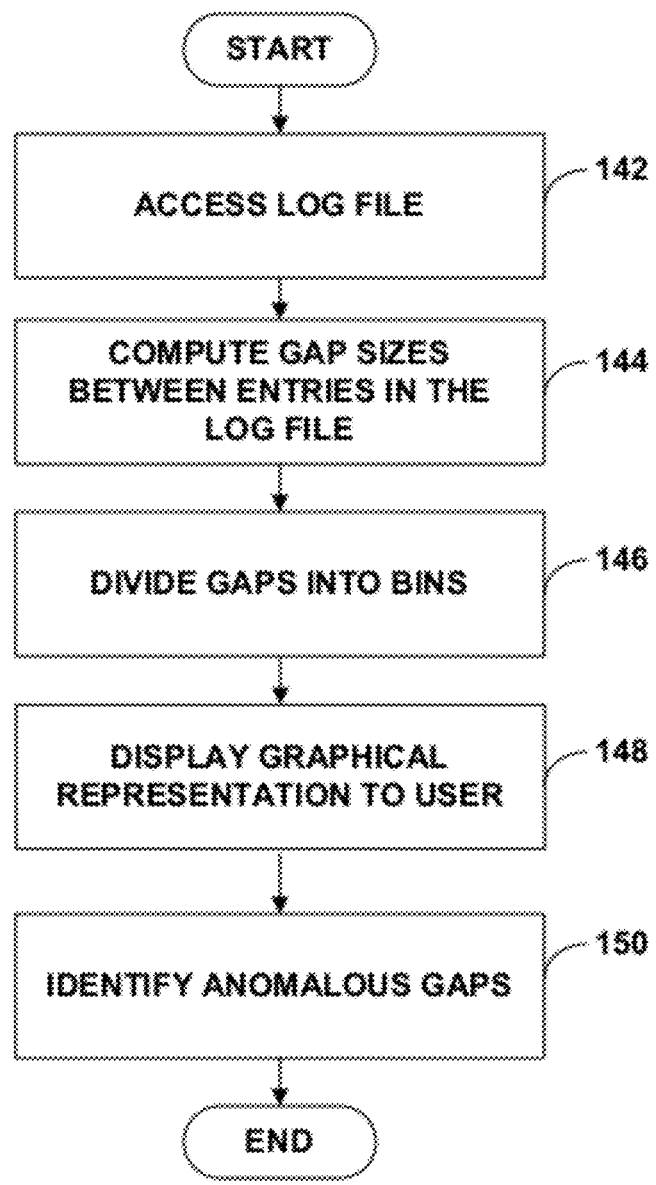
FIG. 15 is a flow diagram illustrating another exemplary analysis script for detecting log file tampering.

FIG. 15 is a flow diagram illustrating another exemplary analysis script for detecting log file tampering. Initially, forensic device 12 accesses a log file acquired from target computing device 16 (142). Forensic device 12 computes the amount of time that elapsed, i.e., gap size, between each of the entries of the log file (144). Forensic device 12 divides the data into "bins" (146). The term "bins" refers to a set of ranges of gap sizes into which each computed gap size is classified. In one embodiment, each of the bins is of equal size on a logarithmic scale and is determined dynamically based on the ranges of the gap sizes. Forensic device 12 may divide the data into bins according to the equation $$\text{Bin\#} = \text{floor}(((\log(\text{gap}_i) - \log(\min))/(\log(\max) - \log(k)))^* \text{bins}_{max}), \quad (1)$$

wherein min is the dynamically calculated minimum gap size, max is the dynamically calculated maximum gap size, $\text{bins}_{max}$ is the maximum number of bins, k is the minimum number of the smallest bin, and $\text{gap}_i$ is the $i^{th}$ gap size (gap of interest). $\text{Bins}_{max}$ and k may be preconfigured values or values that are specified by user 15 upon executing the analysis script.

Forensic system 12 displays a graphical representation of the gap sizes to user 15 (148). The graphical representation may, for example, comprise a histogram illustrating the number of gaps that are in each of the bins. User 15 identifies anomalous gaps based on the histogram (150). Alternatively, forensic system 12 may include logic to determine the existence of anomalous gaps. For example, a typical server may be generating log file entries every 5-10 seconds, and once per second during busy periods. If an intruder were to delete a 5 minute section of the log file entries, the gap analysis results would make that deletion stand out.

Figure 16:
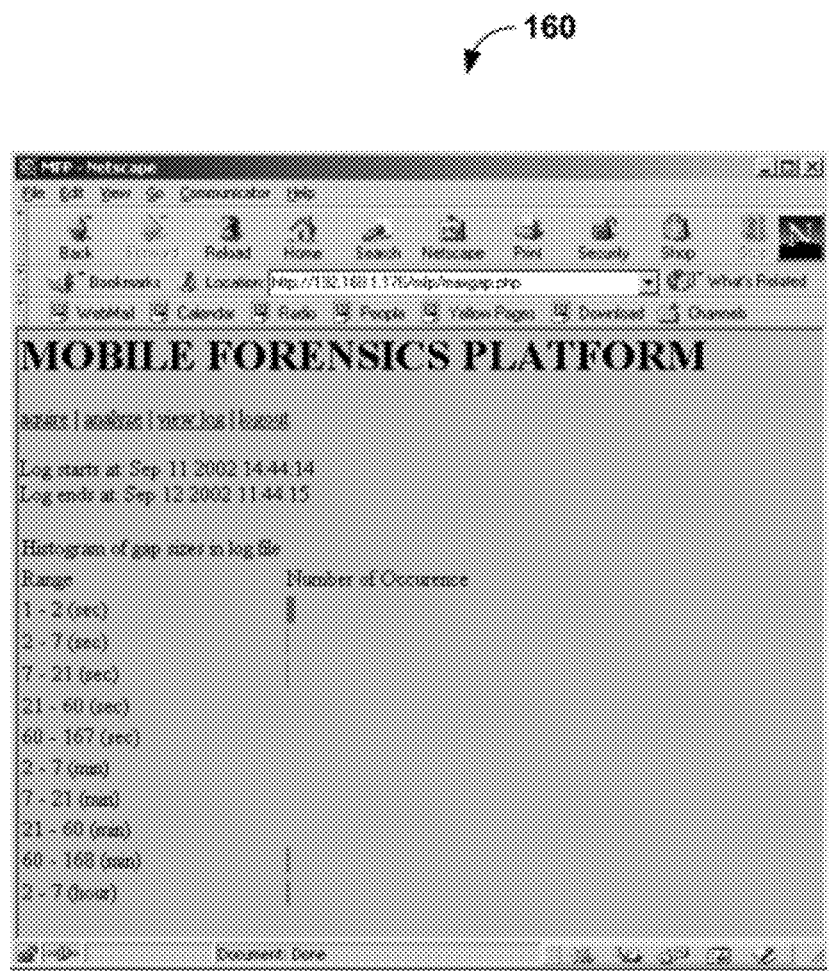
FIG. 16 is a screen illustration of an exemplary user interface that presents a histogram of gap sizes created using a gap analysis software module.

FIG. 16 is a screen illustration of user interface 160 that presents a histogram of gap sizes created using the gap analysis tool. The example user interface 160 of FIG. 16 shows a clear bimodal behavior in which part of the time the machine was active and the gaps were spaced together closely, within 10-20 seconds, and the rest of the time the machine was idle with large gaps (over one hour). If an intruder were active for a few minutes and then erased his activity, the anomalous gap would likely stand out. In this example, the log file had very few entries for exemplary purposes. Nonetheless, user 15 can get a visual representation of the structure of the log files and may be able to detect anomalies.

Figure 17:
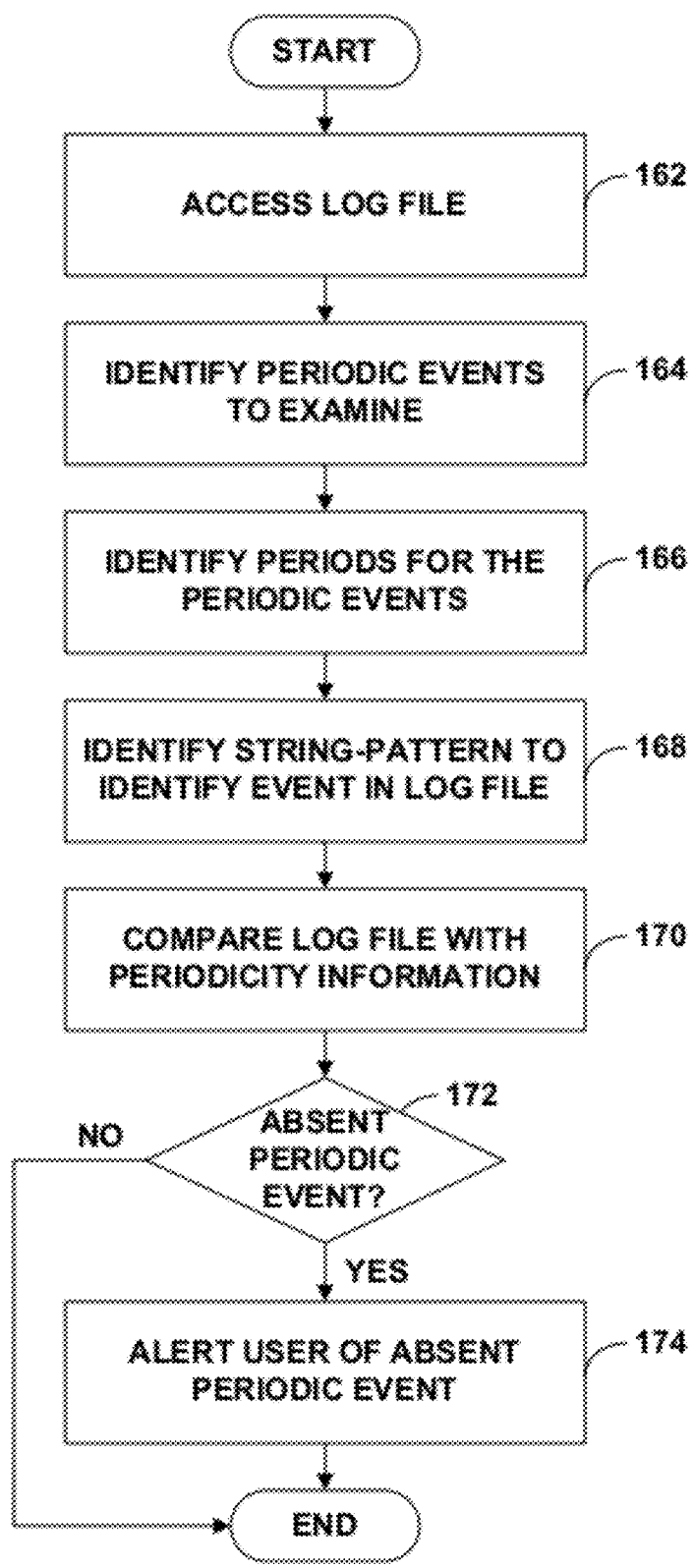
FIG. 17 is a flow diagram illustrating another exemplary analysis script for detecting log file tampering.

FIG. 17 is a flow diagram illustrating another exemplary analysis script for detecting log file tampering. Initially, forensic device 12 accesses a log file acquired from target computing device 16 (162). Forensic device 12 receives input from user 15 identifying a periodic event to examine (164). User 15 may, for example, input an event identifier, such as a string-pattern or other character recognition, to identify entries in the log file corresponding to the periodic event and an expected period of the periodic event.

Forensic device 12 searches the log file for entries matching the identified periodic event, computes the period since the last occurrence of the event, and compares the period with input from user 15 to determine whether there are any periods in which an expected periodic event was absent (166, 168). When forensic device 12 identifies an absent period, forensic device 12 notifies user 15 of this absent periodic event (170, 172). Alternatively, forensic device 12 may present a graphical representation of the entries of the log file that match the event identifier input by user 15 and allow user 15 to determine any absent periodic events. In this manner, user 15 examines log files to ensure that certain events that should occur regularly, do in fact occur at the appropriate intervals.

Various embodiments of the invention have been described. For example, although described in reference to collection of computer evidence in a forensic inquiry, the techniques of the invention may be applied in other computer data monitoring and analysis scenarios. For instance, the techniques of the invention may allow a network monitor to continuously or periodically monitor a network, including the states of computing devices on the network. The network administrator may be able to acquire detailed state information and other data from the computing devices of the network in order to address network problems as well as monitor and assess network misuse. These and other embodiments are within the scope of the following claims.

The invention claimed is:

1. A method comprising:
receiving, with a forensic device, input from a user that identifies a target computing device coupled to the forensic device via a communication link;
automatically selecting, based on the target computing device, at least one of a plurality of access methods via which to perform acquisition operations to acquire computer evidence from the target computing device;
communicating commands associated with the acquisition operations from the forensic device to the target computing device via the selected acquisition methods to initiate the acquisition operations on the target computing device to acquire the computer evidence from the target computing device with the forensic device without pre-loading acquisition software on the target computing device prior to initiating the acquisition; and
presenting a user interface for the forensic device through which the remote views the computer evidence acquired from the target computing device.

2. The method of claim 1, wherein automatically selecting at least one of a plurality of access methods comprises automatically selecting the at least one of a plurality of access methods based on both: (1) a type of data to be acquired from the target computing device as forensic evidence, and (2) a type of operating system executed by the target computing device.

3. The method of claim 1, wherein the plurality of access methods includes at least two or more of Windows Management Instrumentation (WMI), Server Message Block (SMB), Secure Shell (SSH), Remote Shell (RSH), Network File System (NFS), Apple Filing Protocol (AFP), File Transfer Protocol (FTP), and Hypertext Transfer Protocol (HTTP).

4. The method of claim 1, further comprises automatically determining, with the forensic device, an order for performing the acquisition operations that reduces the impact on other data stored on the target computing device.

5. The method of claim 1, wherein presenting the user interface for the forensic device through which the user views and analyzes the computer evidence acquired from the target computing device comprises presenting the user interface for the forensic device through which the user views and analyzes the computer evidence acquired from the target computing device on-line.

6. The method of claim 1, further comprising acquiring additional computer evidence while the user views and analyzes the previously acquired computer evidence.

7. The method of claim 1, wherein acquiring the computer evidence from the target computing device comprises acquiring the computer evidence from the target computing device while the target computing device is active.

8. The method of claim 1, further comprising receiving input from the user instructing the forensic device to analyze the computer evidence.

9. The method of claim 1, wherein acquiring the computer evidence from the target computing device comprises acquiring state information from the target computing device that includes at least one of running process information and open network ports with associated processes.

10. The method of claim 1, further comprising performing a subset of the acquisition operations to acquire at least one of an log file and communication statistics prior to performing the other acquisition operations.

11. The method of claim 10, further comprising performing the acquisition operation to acquire the communication statistics after performing the acquisition operation to acquire the log file.

12. The method of claim 10, further comprising performing the acquisition operation to acquire the log file after performing the acquisition operation to acquire the communication statistics.

13. The method of claim 10, further comprising performing an acquisition operation to acquire general system information from the target computing device after performing the subset of the acquisition operations to acquire the at least one of the log file and communication statistics prior to any other acquisition operations.

14. The method of claim 10, wherein the log file comprises one of a system event log, an application event log, and a security event log, web server log file, Unix SYSLOG file, a mail log file, an accounting log file, and a router flow log file.

15. The method of claim 10, wherein the communications statistics comprises one of Ethernet statistics and network protocol statistics.

16. The method of claim 10, further comprising determining an order in which to perform acquisition operations.

17. The method of claim 1, further comprising:
receiving case information and target device information from a user to define a new inquiry;
creating a new inquiry based on the received information; and
associating the new inquiry with a case.

18. The method of claim 17, wherein the case information comprises at least one of a case number, case name, principle investigator, location to store the collected data, and a time zone for date/time reporting.

19. The method of claim 17, wherein the target computing device information includes at least one of a target computing device host name, IP address, operating system, access methods and password.

20. The method of claim 1, further comprising storing a copy of the computer evidence originally acquired from the target computing device.

21. The method of claim 1, further comprising:
normalizing the acquired computer evidence to a common format; and
storing the normalized computer evidence.

22. The method of claim 21, wherein normalizing the acquired computer evidence to a common format comprises at least one of converting timestamp data from a local time zone of the target computing device to a standard time zone, converting data having host names and IP addresses to all host names, converting data having host names and IP addresses to all IP addresses, and normalizing the clock of the target computing device to that of the forensic device.

23. The method of claim 1, further comprising:
performing a cryptographic hash on the computer evidence when acquired; and
storing the resulting hash value representative of an unaltered stated of the computer evidence.

24. The method of claim 1, further comprising maintaining an audit log of transactions performed by the forensic device.

25. The method of claim 24, wherein maintaining the audit log comprises at least one of tracking computer evidence downloaded from the target computing device, browsing of the computer evidence by the user, and analyses performed on the computer evidence, and wherein the audit log comprises a timestamp corresponding to each transaction, an investigator identifier corresponding to the investigator performing each transaction, and a description of each transaction.

26. The method of claim 1, wherein the computer evidence comprises at least one log file, the method further comprising:
receiving input from the user to analyze the log file for tampering;
analyzing the log file to detect log file tampering; and
displaying to the user the results of the analysis.

27. The method of claim 26, wherein analyzing the log file to detect log file tampering comprises determining whether the entries in the log file are in ascending order.

28. The method of claim 26, wherein analyzing the log file to detect log file tampering comprises:
computing time gaps between entries of the log file;
identifying anomalous time gaps; and
displaying to the user the identified anomalous gaps.

29. The method of claim 26, wherein analyzing the log file to detect log file tampering comprises:
computing time gaps between entries of the log file;
generating a graphical representation of the time gaps; and
displaying the graphical representation to the user.

30. The method of claim 26, wherein analyzing the log file to detect log file tampering comprises:
receiving input that identifies a periodic event;
detecting an absent periodic event within the log file; and
alerting the user of the absent periodic events.

31. The method of claim 30, wherein receiving input that identifies the periodic event comprises:
receiving input that identifies a period of the periodic event; and
receiving input that identifies an identifier associated with the periodic event.

32. The method of claim 31, wherein detecting absent periodic events within the log file comprises:
searching for the log file for the periodic event identifier;
computing the amount of time that elapsed between each of the periodic event identifiers; and
comparing the period of the event with the computed elapsed times to detect absent periodic events.

33. The method of claim 30, wherein identifying the periodic event comprises receiving input from the user identifying the periodic event.

34. The method of claim 1, wherein acquiring the computer evidence from the target computing device comprises acquiring an image of at least one of a disk attached to the target computing device and a memory of the target computing device, and further comprising examining the acquired image to identify at least one of files, process or operating system data structures, boot information, deleted files or directories, and data hidden in unallocated space.

35. The method of claim 1, wherein the communication link comprises a customer network of the target computing device.

36. The method of claim 1, wherein a client device is coupled to the forensic device via one of a public network, a customer network of the target computing device, a phone line, a universal serial bus (USB), a wireless port, a serial port, a parallel port and an infrared link.

37. The method of claim 1, wherein the target computing device comprises one of a personal computer, a handheld computer, a laptop, a workstation, a router, a gateway device, a firewall device, a web server, a file server, a database server, a mail server, a print server, a network-enabled personal digital assistant, and a network-enabled phone.

38. A system comprising:
a target computing device;
a forensic device coupled to the target computing device via a customer network of the target computing device;
a client device; and
a user interface module to present a user interface for the forensic device that is remotely accessible by the client device,
wherein the forensic device receives input via the user interface that identifies computer evidence to acquire from a target computing device,
wherein, in response, the forensic device automatically selects, based on the target computing device, at least one of a plurality of access methods via which to perform acquisition operations to acquire computer evidence from the target computing device and communicates commands associated with the acquisition operations from the forensic device to the target computing device via the selected acquisition methods to acquire the computer evidence from the target computing device without pre-loading acquisition software on the target computing device prior to acquiring the computer evidence, stores the computer evidence, and
wherein the forensic device presents the computer evidence to the remote user for analysis via the user interface.

39. The system of claim 38, wherein the forensic device automatically selects the at least one of a plurality of access methods based on a type of data to be acquired from the target computing device as forensic evidence and a type of operating system executed by the target computing device.

40. The system of claim 38, wherein the plurality of access methods includes at least two or more of Windows Management Instrumentation (WMI), Server Message Block (SMB), Secure Shell (SSH), Remote Shell (RSH), Network File System (NFS), Apple Filing Protocol (AFP), File Transfer Protocol (FTP), and Hypertext Transfer Protocol (HTTP).

41. The system of claim 38, wherein the forensic device presents the user nterface to the remote user to allow the remote user to view and analyze the data on-line.

42. The system of claim 38, wherein the forensic device acquires additional computer evidence from the target computing device while the remote user views and analyzes the previously acquired computer evidence.

43. The system of claim 38, wherein the forensic device acquires the computer evidence from the target computing device while the target computing device is active.

44. The system of claim 38, wherein the forensic device acquires state information from the target computing device.

45. The system of claim 38, wherein the remote user identifies a plurality of acquisition operations to perform and the forensic device performs the acquisition operations in an order that reduces the impact on other data stored on the target computing device.

46. The system of claim 45, wherein the forensic device performs the acquisition operations to acquire at least one of a log file and communication statistics prior to any other acquisition operations.

47. The system of claim 46, wherein the forensic device performs an acquisition operation to acquire general system information from the target computing device after performing the acquisition operations to acquire the at least one of the log file and communication statistics prior to any other acquisition operations.

48. The system of claim 47, wherein the forensic device stores a copy of the computer evidence originally acquired from the target computing device, normalizes the acquired computer evidence to a common format, stores the normalized computer evidence, performs a cryptographic hash on the computer evidence, and stores the resulting hash value.

49. The system of claim 47, wherein the computer evidence comprises at least one log file, and wherein the forensic device analyzes the log file to detect log file tampering and displays to the user the results of the analysis.

50. The system of claim 49, wherein the forensic device determines whether the entries in the log file are in ascending order.

51. The system of claim 49, wherein the forensic device computes time gaps between entries of the log file, identifies anomalous time gaps, and displays to the user the identified anomalous gaps.

52. The system of claim 49, wherein the forensic device computes time gaps between entries of the log file, generates a graphical representation of the time gaps, and displays the graphical representation to the user.

53. The system of claim 49, wherein the forensic device receives input identifying a period and an identifier associated with a periodic event, searches the log file for the periodic event identifier, computes the amount of time that elapsed between each of the periodic event identifiers, and compares the period of the event with the computed elapsed times to detect an absent periodic event, and alerts the user of the absent periodic event.

54. The system of claim 46, wherein the log file comprises one of a system event log, an application event log, a security event log, web server log file, Unix SYSLOG file, a mail log file, an accounting log file, and a router flow log file.

55. The system of claim 46, wherein the communications statistics comprises one of Ethernet statistics and network protocol statistics.

56. The system of claim 38, wherein the forensic device receives case information and target device information from a user to define a new inquiry, creates a new inquiry based on the received information, and associates the new inquiry with a case.

57. The system of claim 56, wherein the case information comprises at least one of a case number, case name, principle investigator, location to store the collected data, and a time zone for date/time reporting.

58. The system of claim 56, wherein the target computing device information includes at least one of a target computing device host name, IP address, operating system, access methods and password.

59. The system of claim 38, wherein the forensic device maintains an audit log of transactions to track at least one of computer evidence downloaded from the target computing device, browsing of the computer evidence by the remote user, and analyses performed on the computer evidence, and wherein the audit log comprises a timestamp corresponding to each transaction, an investigator identifier corresponding to the investigator performing each transaction, and a description of each transaction.

60. The system of claim 38, wherein the forensic device acquires an image of at least one of a disk attached to the target computing device and a memory of the target computing device and examines the acquired image to identify at least one of files, process or operating system data structures, boot information, deleted files or directories, and data hidden in unallocated space.

61. The system of claim 38, wherein the target computing device comprises one of a personal computer, a handheld computer, a laptop, a workstation, a router, a gateway device, a firewall device, a web server, a file server, a database server, a mail server, a print server, a network-enabled personal digital assistant, and a network-enabled phone.

62. The system of claim 38, wherein the forensic device is coupled to a same local subnet as the target computing device.

63. The system of claim 38, wherein the client device is coupled to the forensic device via one of a public network, a customer network of the target computing device, a phone line, a universal serial bus (USB), a wireless port, a serial port, a parallel port and an infrared link.

* * * * *